(12) United States Patent
Yoneda et al.

(10) Patent No.: US 9,313,369 B2
(45) Date of Patent: Apr. 12, 2016

(54) DEVICE AND METHOD FOR MANAGING SHARED DATA, AND COMPUTER-READABLE STORAGE MEDIUM FOR COMPUTER PROGRAM

(71) Applicant: Konica Minolta, Inc., Tokyo (JP)

(72) Inventors: Shuji Yoneda, Osaka (JP); Kenichi Takahashi, Osaka (JP); Kaitaku Ozawa, Hyogo (JP); Nobuhiro Mishima, Osaka (JP); Masami Yamada, Osaka (JP); Yuki Asai, Hyogo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/290,604

(22) Filed: May 29, 2014

(65) Prior Publication Data

US 2014/0355037 A1    Dec. 4, 2014

(30) Foreign Application Priority Data

May 31, 2013 (JP) .................................. 2013-115616

(51) Int. Cl.
*H04N 1/44* (2006.01)
*H04N 5/232* (2006.01)

(52) U.S. Cl.
CPC ......... *H04N 1/4406* (2013.01); *H04N 5/23206* (2013.01); *H04N 5/23216* (2013.01); *H04N 2201/0094* (2013.01)

(58) Field of Classification Search
USPC ......... 358/1.14, 1.15, 1.18, 1.2, 1.9; 707/758; 726/17, 28
See application file for complete search history.

(56) References Cited

U.S. PATENT DOCUMENTS

| 7,725,421 | B1 | 5/2010 | Gedalius et al. | |
|---|---|---|---|---|
| 7,941,844 | B2 * | 5/2011 | Anno | 726/17 |
| 8,510,856 | B2 * | 8/2013 | Murakawa | 726/28 |
| 8,516,088 | B2 * | 8/2013 | Bae | 709/221 |
| 9,116,652 | B2 * | 8/2015 | Yun | H04W 64/00 |
| 2005/0216575 | A1 * | 9/2005 | Armstrong et al. | 709/223 |
| 2007/0192122 | A1 | 8/2007 | Routson et al. | |

(Continued)

FOREIGN PATENT DOCUMENTS

| JP | 2008-186338 A | 8/2008 |
|---|---|---|
| JP | 2010-044519 A | 2/2010 |

(Continued)

OTHER PUBLICATIONS

Office Action issed in corresponding Japenese Patent Application No. 2013-115616 dated May 12, 2015 (6 pages).

*Primary Examiner* — Allen H Nguyen
(74) *Attorney, Agent, or Firm* — Osha Liang LLP

(57) ABSTRACT

A shared data managing device is provided which manages shared data by setting an access right on a first user account basis. The first user account has a first identifier and first user information on a first user receiving a first service. The device includes an obtaining portion for obtaining, from a service providing system for a second service, a second identifier of a second user account used for the second service and second user information on a second user; a pairing portion for making a pair of the first identifier and the second identifier of the first user account and the second user account that are common in the first user information and the second user information; and a transmission portion for sending, to the service providing system, the shared data, the pair made, and the access right on a first user account basis.

8 Claims, 25 Drawing Sheets

(56) References Cited

U.S. PATENT DOCUMENTS

| | | |
|---|---|---|
| 2011/0122439 A1 | 5/2011 | Sato et al. |
| 2011/0202986 A1 | 8/2011 | Horn et al. |
| 2012/0272188 A1* | 10/2012 | Kunitake et al. .............. 715/811 |
| 2013/0073584 A1 | 3/2013 | Kuper et al. |
| 2013/0235418 A1* | 9/2013 | Tanaka ......................... 358/1.15 |
| 2013/0242335 A1* | 9/2013 | Naitoh ................. G06K 15/405 358/1.14 |
| 2014/0325678 A1* | 10/2014 | Kotla ...................... G06F 21/62 726/28 |

FOREIGN PATENT DOCUMENTS

| | | |
|---|---|---|
| JP | 2011-114538 A | 6/2011 |
| JP | 2011-155385 A | 8/2011 |
| JP | 2012-119824 A | 6/2012 |
| WO | 2013/043958 A2 | 3/2013 |

* cited by examiner

FIG. 3

| MFP_ID | MFP PASSWORD | BUSINESS E-MAIL ADDRESS | |
|---|---|---|---|
| M001 | aaabbb### | sato@x-corp.example.co.jp | ~62 |
| M002 | cccddd$$$ | suzuki@x-corp.example.co.jp | ~62 |
| M003 | eee%%%fff | kimura@x-corp.example.co.jp | ~62 |
| M004 | abc123### | inoue@x-corp.example.co.jp | ~62 |
| M005 | xyz111999 | wada@x-corp.example.co.jp | ~62 |
| ⋮ | ⋮ | ⋮ | |

FIG. 6

| SNS_ID | SNS PASSWORD | SNS E-MAIL ADDRESS | CONCERNED PERSON SNS_ID |
|---|---|---|---|
| S001 | xxxyyyzzz | sato@x-corp.example.co.jp | S002,S003 |
| S002 | aaabbbccc | wada@x-corp.example.co.jp | S001,S005,S123 |
| S003 | qqqwwweee | hanako@free.example.ne.jp | S005,S012 |
| S004 | aaa111222 | suzuki@x-corp.example.co.jp | S001,S005,S123 |
| S005 | bbbccc333 | ichiro@freemail.example.com | S001,S020 |
| ... | ... | ... | ... |

| MFP_ID | BUSINESS E-MAIL ADDRESS |
|---|---|
| M001 | sato@x-corp.example.co.jp |
| M002 | suzuki@x-corp.example.co.jp |
| M003 | kimura@x-corp.example.co.jp |
| M004 | inoue@x-corp.example.co.jp |
| M005 | wada@x-corp.example.co.jp |
| ⋮ | ⋮ |

MATCHING

· M002-S004
· M005-S002

602

| SNS_ID | SNS E-MAIL ADDRESS |
|---|---|
| S002 | wada@x-corp.example.co.jp |
| S004 | suzuki@x-corp.example.co.jp |
| S005 | ichiro@freemail.example.com |

| MFP_ID | SNS_ID |
|--------|--------|
| M002   | S004   ~65
| M005   | S002   ~65

FIG. 17

PLEASE SELECT DOCUMENT DATA TO BE UPLOADED.

⦿ SALES DIVISION REPORT ON DEC. 2012

○ NEW PRODUCT BROCHURE

○ STRATEGY MEETING MATERIAL

○ BUSINESS OFFICE LIST

OK

3SC3

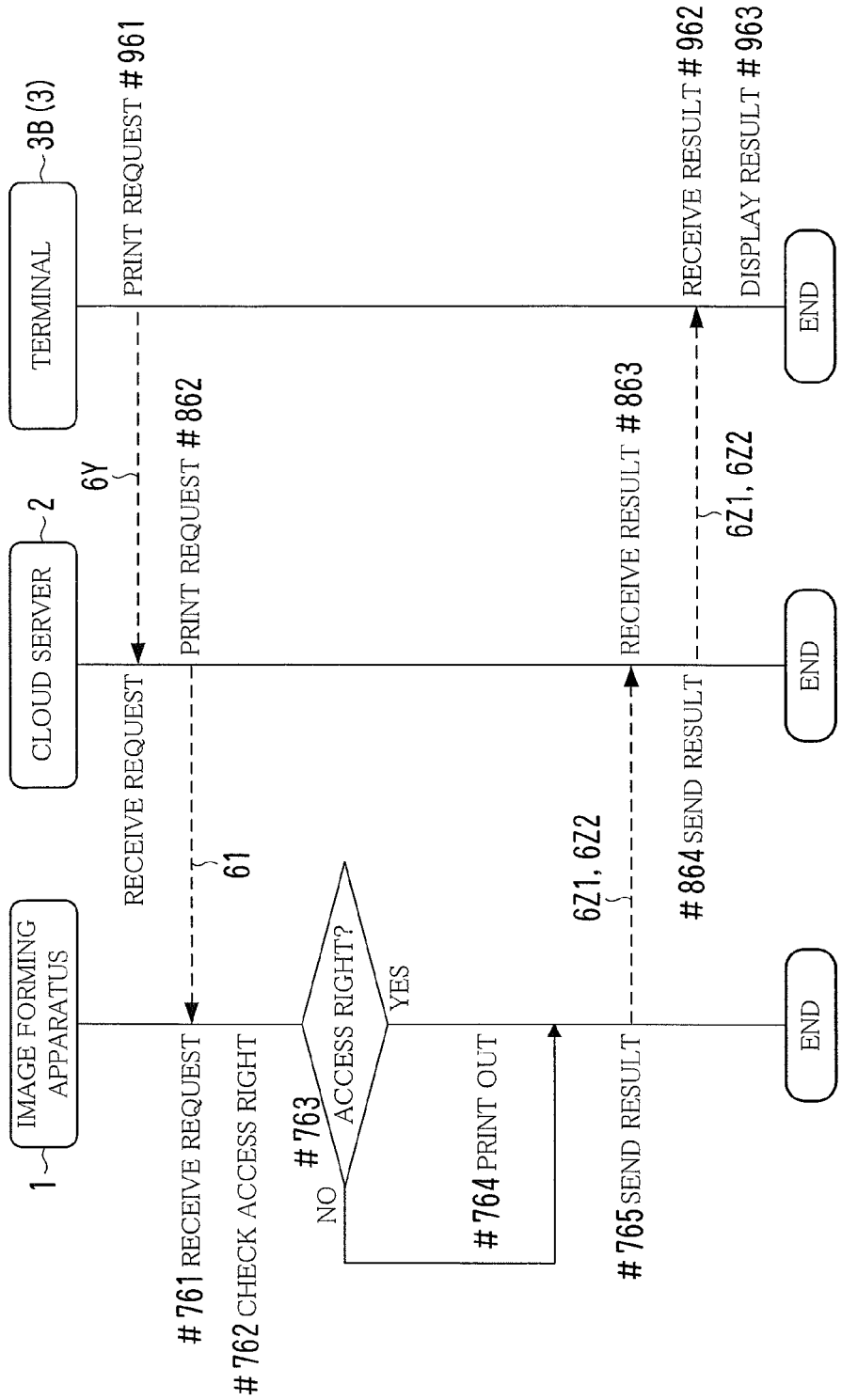

DEVICE AND METHOD FOR MANAGING SHARED DATA, AND COMPUTER-READABLE STORAGE MEDIUM FOR COMPUTER PROGRAM

This application is based on Japanese patent application No. 2013-115616 filed on May 31, 2013, the contents of which are hereby incorporated by reference.

BACKGROUND OF THE INVENTION

1. Field of the Invention

The present invention relates to a device and method for managing data in accordance with an access right, and so on.

2. Description of the Related Art

Recent years have seen the widespread use of intranets in organizations such as public offices, business offices, and schools. Such an intranet is often provided with a server for managing data shared by a plurality of users. In general, among such servers, one that manages data on a file-by-file basis is called a "file server", and one that manages data by using an application of a database is called a "database server" in many cases.

Recent years also have seen the widespread use of image forming apparatuses having various functions such as copying, faxing, scanning, and network printing. Such image forming apparatuses are sometimes called "multifunction devices", "Multi-Functional Peripherals (MFPs)", or the like. Such image forming apparatuses have recently been provided with a data server function.

A plurality of image forming apparatuses is often provided in one intranet. In such a case, data may be shared by the image forming apparatuses through a communication line, and data may be also shared through a removable storage medium such as a Universal Serial Bus (USB) memory (Japanese Laid-open Patent Publication No. 2012-119824).

When access to data is allowed without any limitation, something undesirable for security may occur. In view of this, a method has been well-known in which access to data is restricted by setting an access right on a data-by-data basis.

Such a work to set access rights is burdensome to a data administrator. To cope with this, the following method has been proposed. A PC extracts a face image from digital photo images, generates a registered person list for the respective face images, also generates a human relation meta DB. The PC calculates a share candidate point for a person in the registered person list on the basis of the temporal and distance closeness of the selected photo and the other photos, relation strength in the human relation meta DB and a past photo share history for the photo selected from a photo list by a user. The PC displays, as a share candidate, information related to a person of whom the share candidate point is equal to or higher than a first value. The PC displays the person of whom the share candidate point is equal to or higher than the second value by setting the check box at ON (Japanese Laid-open Patent Publication No. 2011-155385).

It is also possible to manage data in an integrated manner by using a directory service such as Active Directory by Microsoft Corporation (Japanese Laid-open Patent Publication No. 2011-114538).

Further, a cloud computing technology has recently attained widespread use. The technology enables data to be saved in an online storage which is a virtual storage over the Internet, and also enables a plurality of users to share such data.

Data saved to a server on an intranet also can be saved to an online storage over the Internet. By virtue of this arrangement, a user can use the data at an organization facility by gaining access to the server on the intranet, and use the data in a location outside the facility by gaining access to the online storage over the Internet.

In order that a user can use same data independently of whether he/she obtains access to the server on the intranet or to the online storage over the Internet, setting access rights is burdensome. This is because a user account necessary to log into the server on the intranet is different from a user account necessary to log into the online storage over the Internet.

This drawback is not solved by the method described in Japanese Laid-open Patent Publication No. 2011-114538. The method described in Japanese Laid-open Patent Publication No. 2011-155385 probably reduces a burden of making settings of an access right for data stored in the online storage over the Internet. It is however desired that access can be restricted more simply than the method described in the publication.

SUMMARY

The present invention has been achieved in light of such an issue, and an object thereof is to control, in two systems where different user accounts are used, access to a set of data based on a same access right more easily than is conventionally possible.

A shared data managing device according to an aspect of the present invention is a shared data managing device for managing shared data by setting an access right on a first user account basis, the first user account having a first identifier and first user information on a first user who is to receive a first service. The device includes an obtaining portion configured to obtain, from a service providing system providing a second service, a second identifier of a second user account used for the second service and second user information on a second user; a pairing portion configured to make a pair of the first identifier and the second identifier of the first user account and the second user account that are common in the first user information and the second user information; and a transmission portion configured to send, to the service providing system, the shared data, the pair of the first identifier and the second identifier, and the access right on a first user account basis.

A shared data managing device according to another aspect of the present invention is a shared data managing device that receives shared data from another device and manages the shared data on a second user account basis, the second user account having a second identifier and second user information on a second user who is to receive a second service, the other device managing the shared data by setting an access right on a first user account basis, the first user account having a first identifier and first user information on a first user who is to receive a first service. The shared data managing device includes a transmission portion configured to send, to the other device, the second identifier and the second user information on a second user account basis; a receiving portion configured to receive the access right on a first user account basis, and a pair of the first identifier and the second identifier of the first user account and the second user account that are common in the first user information and the second user information, the pair being made by the other device; and a control portion configured to control, when a request for access to the shared data with the second user account is made, access to the shared data in accordance with the access right corresponding to the first user account having the first identifier paired with the second identifier of the second user account.

These and other characteristics and objects of the present invention will become more apparent by the following descriptions of preferred embodiments with reference to drawings.

BRIEF DESCRIPTION OF THE DRAWINGS

FIG. 3 is a diagram showing an example of account data.

FIG. 6 is a diagram showing an example of account data.

FIG. 15 is a diagram depicting an example of checking an MFP address book against an SNS address book.

FIG. 16 is a diagram showing an example of ID pair data.

FIG. 17 is a diagram showing an example of an upload data designation screen.

FIG. 25 is a sequence diagram showing an example of the processing flow of an image forming apparatus, a cloud server, and a terminal for printing.

DESCRIPTION OF THE PREFERRED EMBODIMENTS

Figure 1:
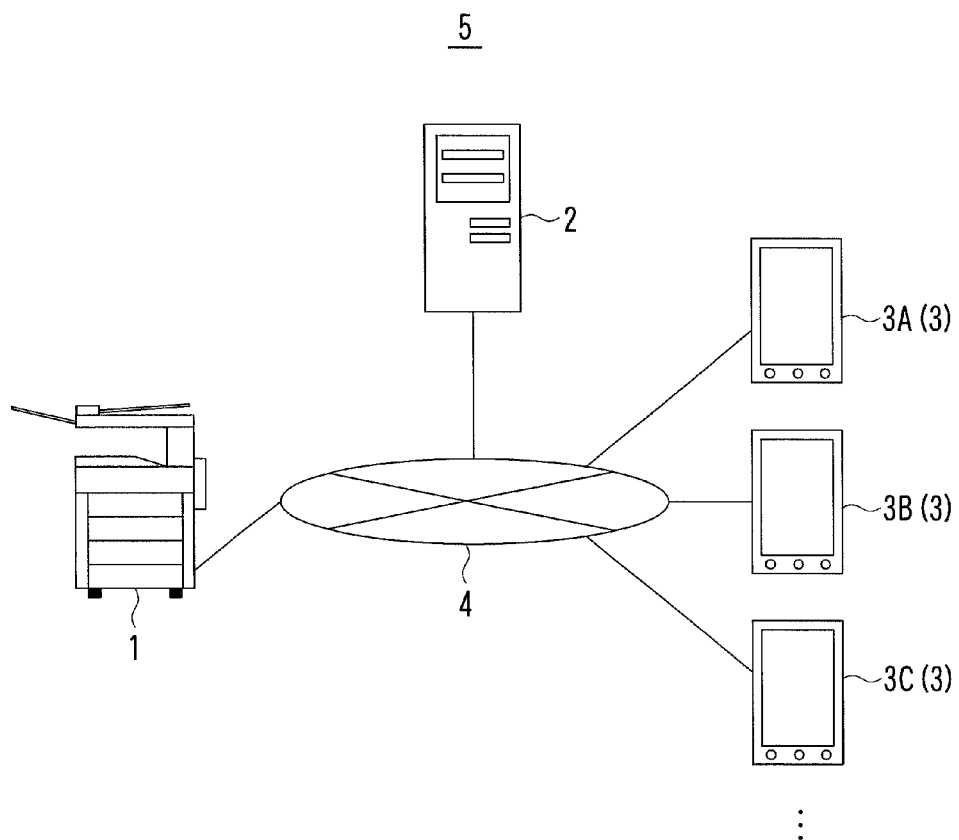
FIG. 1 is a diagram showing an example of the overall configuration of a network system.
Figure 2:
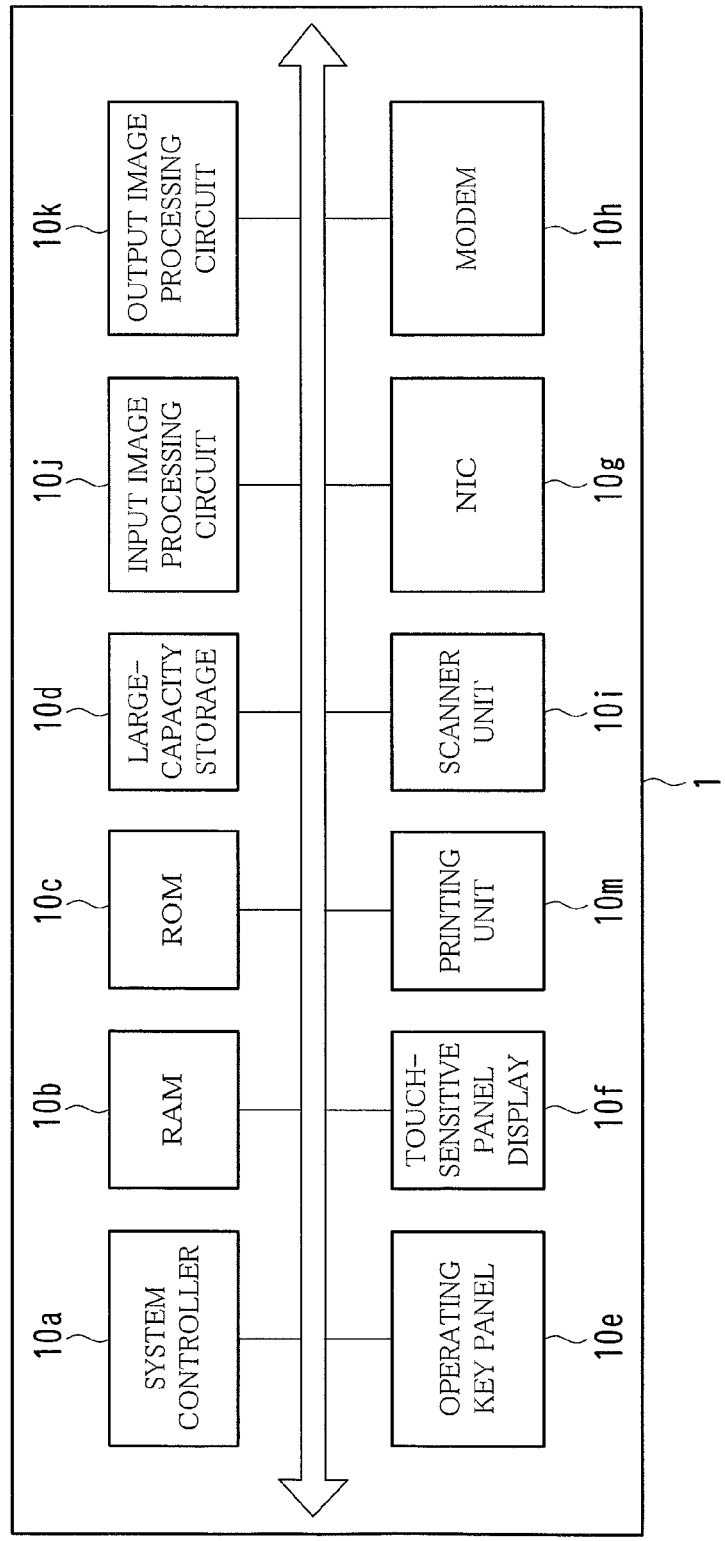
FIG. 2 is a diagram showing an example of the hardware configuration of an image forming apparatus.
Figure 4:
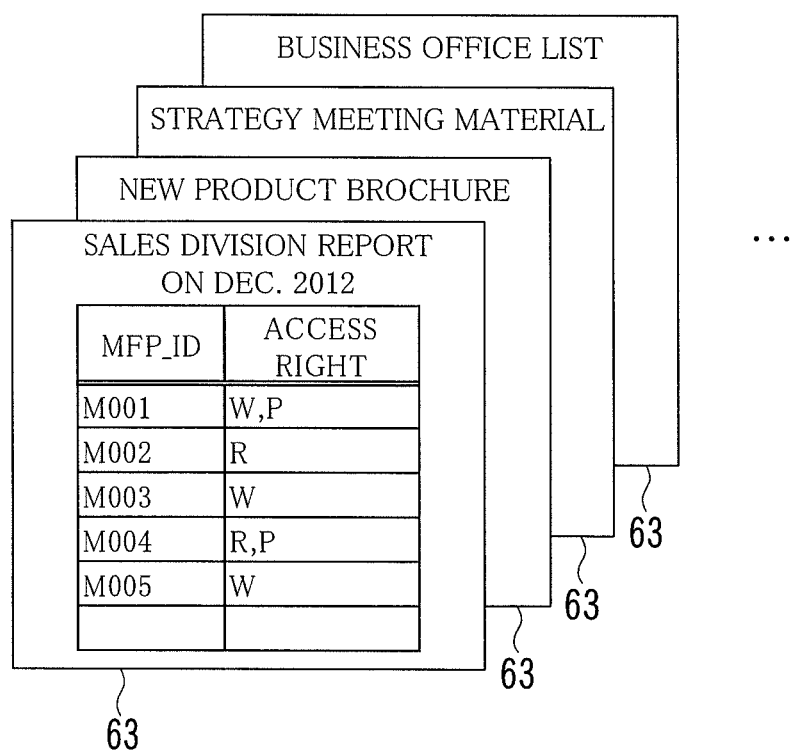
FIG. 4 is a diagram showing an example of access right data.
Figure 5:
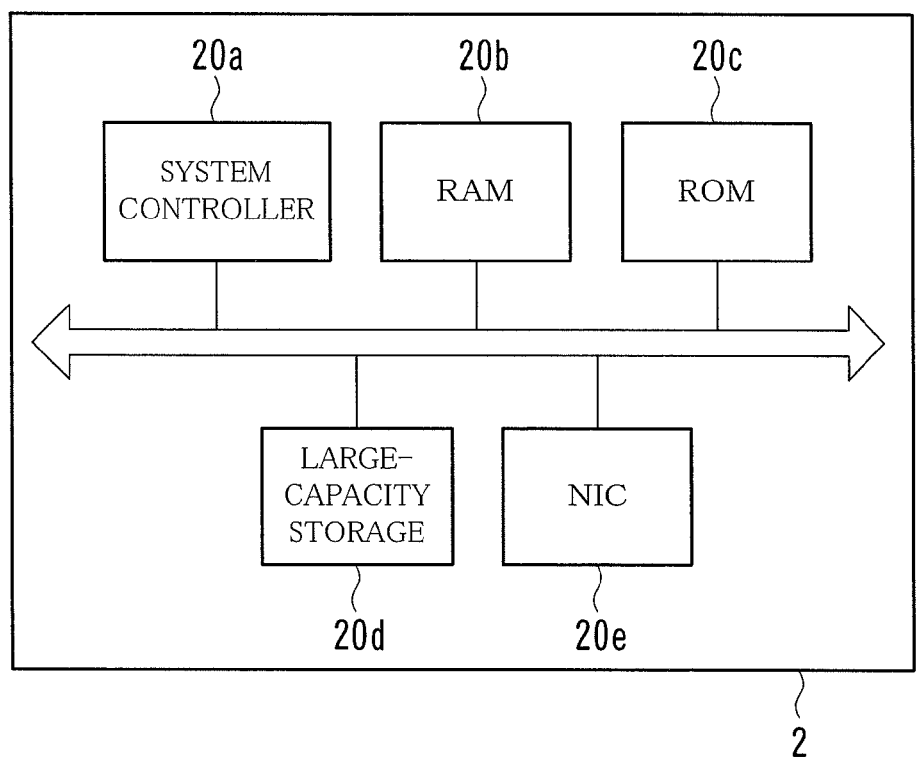
FIG. 5 is a diagram showing an example of the hardware configuration of a cloud server.
Figure 7:
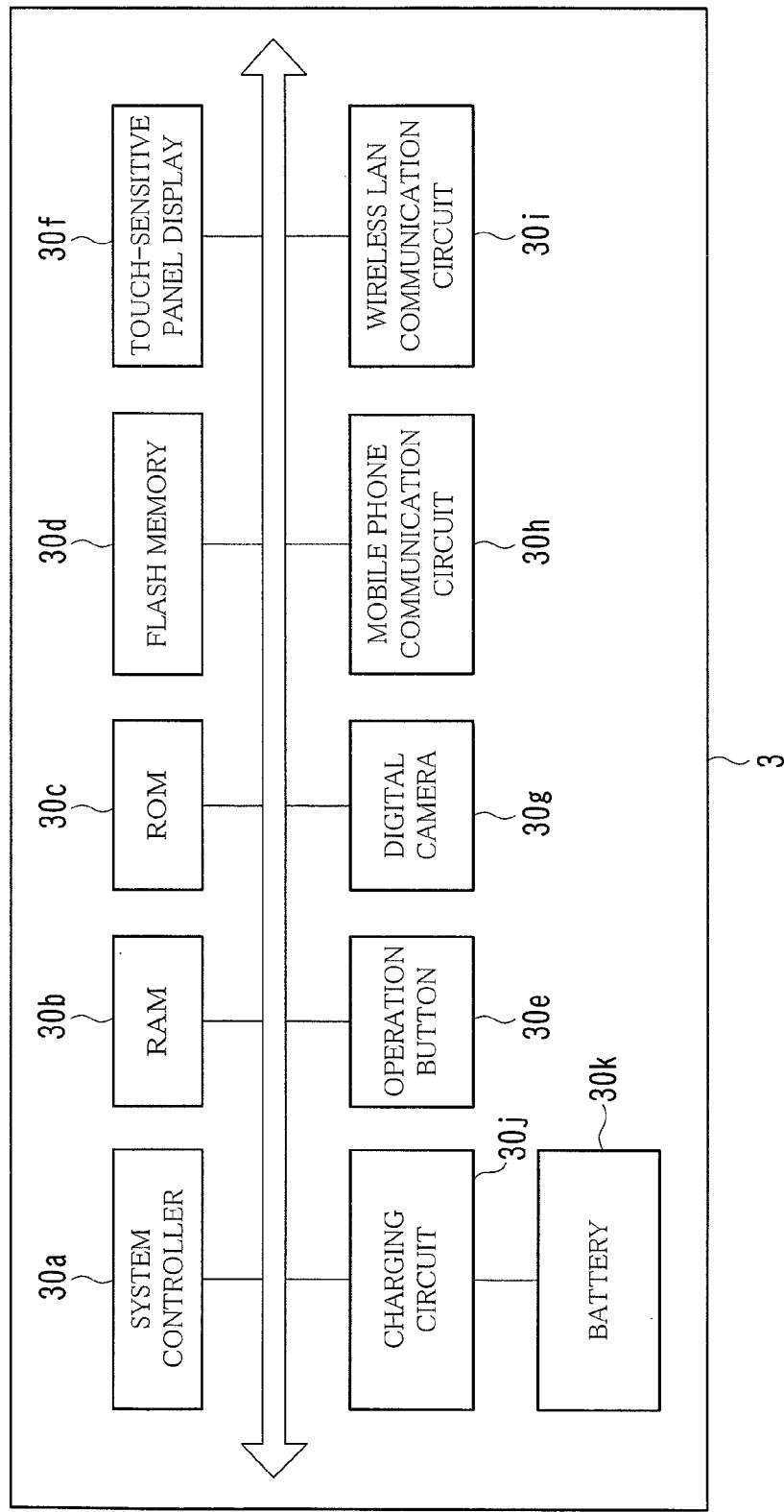
FIG. 7 is a diagram showing an example of the hardware configuration of a terminal.

FIG. 1 is a diagram showing an example of the overall configuration of a network system 5. FIG. 2 is a diagram showing an example of the hardware configuration of an image forming apparatus 1. FIG. 3 is a diagram showing an example of account data 62. FIG. 4 is a diagram showing an example of access right data 63. FIG. 5 is a diagram showing an example of the hardware configuration of a cloud server 2. FIG. 6 is a diagram showing an example of account data 64. FIG. 7 is a diagram showing an example of the hardware configuration of a terminal 3.

As shown in FIG. 1, the network system 5 is configured of the image forming apparatus 1, the cloud server 2, the terminal 3, a communication line 4, and so on.

The image forming apparatus 1, the cloud server 2, and the terminal 3 are configured to perform communication with one another via the communication line 4. Examples of the communication line 4 are a Local Area Network (LAN), a telephone line, a mobile phone line, and the Internet.

The image forming apparatus 1 is an apparatus that is generally called a "Multi-Functional Peripheral (MFP)" or a "multifunction device". The image forming apparatus 1 is an apparatus into which functions such as copying, faxing, scanning, network printing, and box function are consolidated.

The network printing function is a function to print an image onto paper based on image data received from the terminal 3. The network printing function is sometimes called "PC printing" or "network printing".

The box function is a function in which a storage area called a "personal box" or "box" is allocated to each user. The box function enables each user to save data to his/her storage area and to manage the data therein. The box corresponds to a "folder" or "directory" in a personal computer. The following description provides an example in which a box saves therein data of a document representing a character, photo, picture, or chart. Such data is hereinafter referred to as "document data 61".

The image forming apparatus 1 is installed in a facility such as a public office, a corporation, or a school, and is shared by a plurality of users. The following is a description of a case where the image forming apparatus 1 is used in a company. Employees of the company are users of the image forming apparatus 1.

Each of the users is given an account necessary to log into the image forming apparatus 1. The account is given a unique ID. The ID is hereinafter referred to as an "MFP ID". Passwords for authentication are set on a user-by-user basis. The password is hereinafter referred to as an "MFP password". Each of the users is also given an e-mail address to send/receive e-mail messages on business. Hereinafter, the e-mail address is referred to as a "business e-mail address".

Referring to FIG. 2, the image forming apparatus 1 is configured of a system controller 10a, a Random Access Memory (RAM) 10b, a Read Only Memory (ROM) 10c, a large-capacity storage 10d, an operating key panel 10e, a touch-sensitive panel display 10f, a Network Interface Card (NIC) 10g, a modem 10h, a scanner unit 10i, an input image processing circuit 10j, an output image processing circuit 10k, a printing unit 10m, and so on.

The operating key panel 10e includes a start key, a stop key, a reset key, and a numeric keypad. The operating key panel 10e is used for a user to enter a command or information into the image forming apparatus 1.

The touch-sensitive panel display 10f displays, for example, a screen for presenting messages or instructions to a user, a screen for allowing a user to input a processing command and processing conditions, and a screen showing the results of processing performed by the system controller 10a. The touch-sensitive panel display 10f detects a position touched by user's finger, and sends a signal indicating the result of detection to the system controller 10a. The user is also allowed to enter a command or information into the image forming apparatus 1 by touching the touch-sensitive panel display 10f.

The NIC log performs communication with the cloud server 2 and the terminal 3 in accordance with a protocol such as Transmission Control Protocol/Internet Protocol (TCP/IP) through the communication line 4.

The modem 10h performs communication with a fax terminal based on a protocol such as a G3.

The scanner unit 10i optically reads an image from a sheet of paper in which a photograph, character, picture, or a chart is recorded, and generates image data thereof.

The input image processing circuit 10j performs various types of image processing on image data obtained by the NIC 10g, the modem 10h, or the scanner unit 10i based on predetermined conditions or conditions designated by a user.

The output image processing circuit 10k performs various types of image processing on image data of a print target image based on predetermined conditions or conditions designated by a user.

The printing unit 10m prints an image onto paper based on the image data that has been subjected to the image processing by the output image processing circuit 10k.

Figure 8:
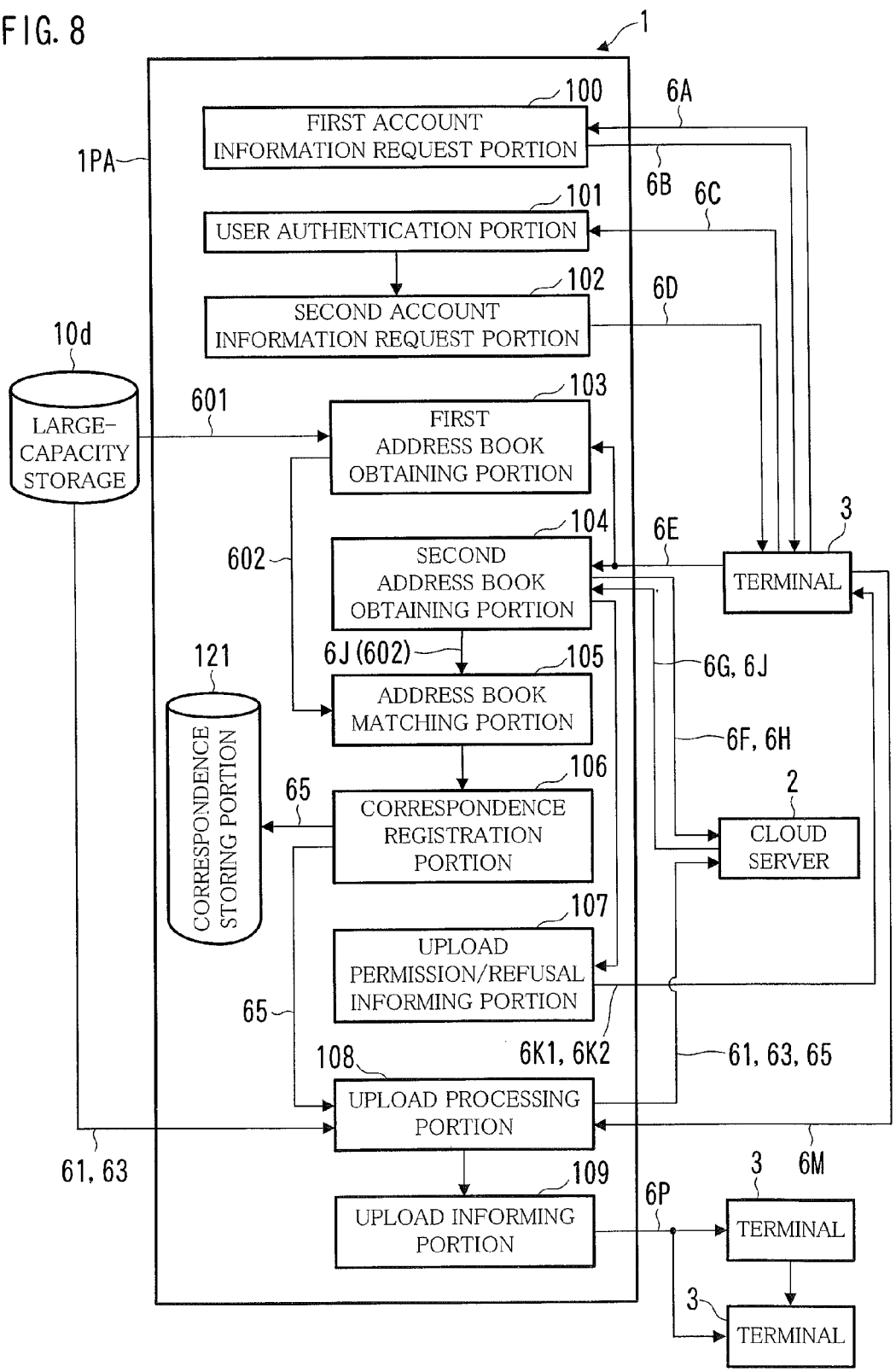
FIG. 8 is a diagram showing an example of the functional configuration implemented in an image forming apparatus by an upload program.
Figure 18:
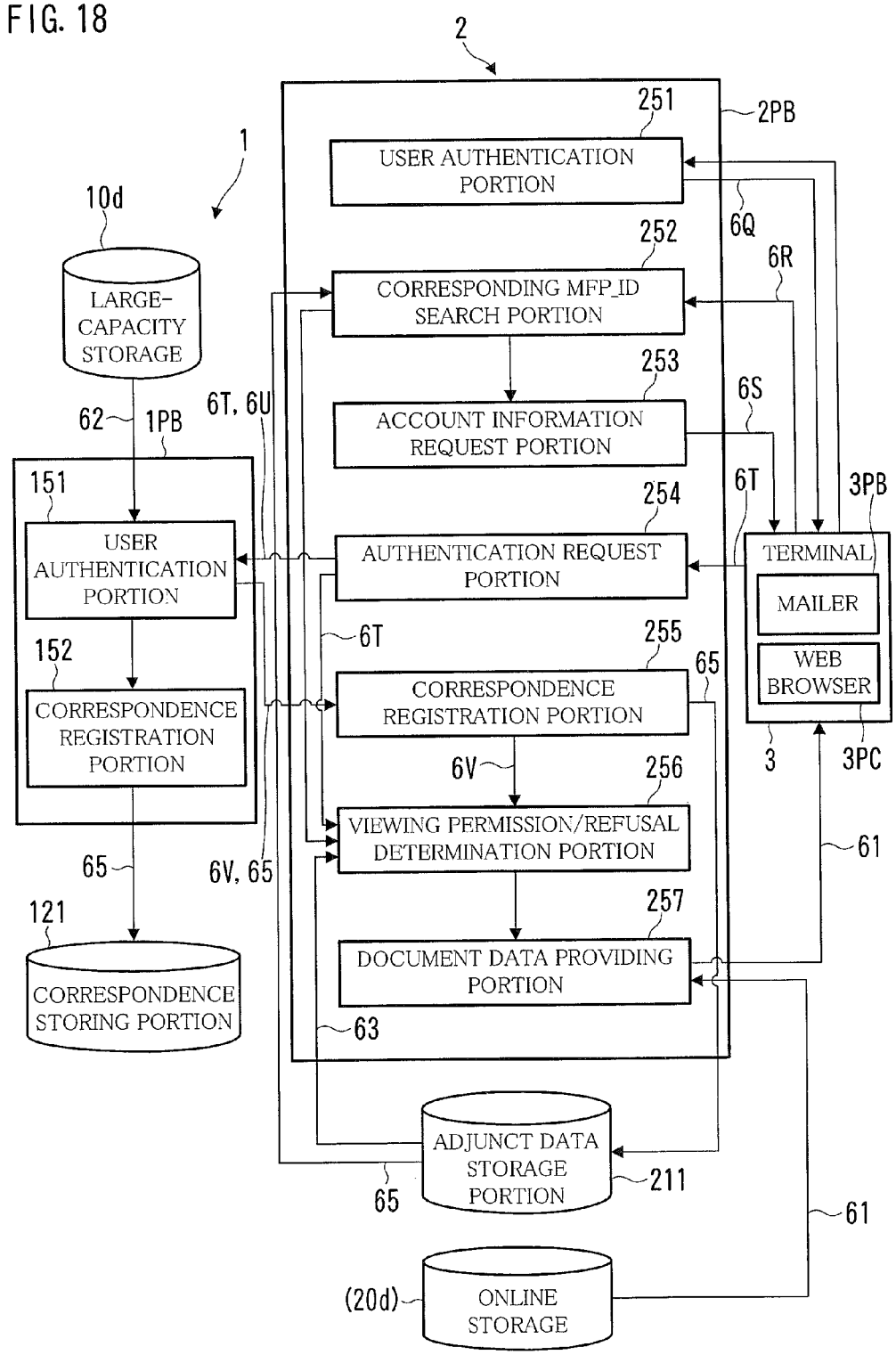
FIG. 18 is a diagram showing an example of the functional configuration implemented in an image forming apparatus by an identity verification program and the functional configuration implemented in a cloud server by a document providing program.
Figure 19:
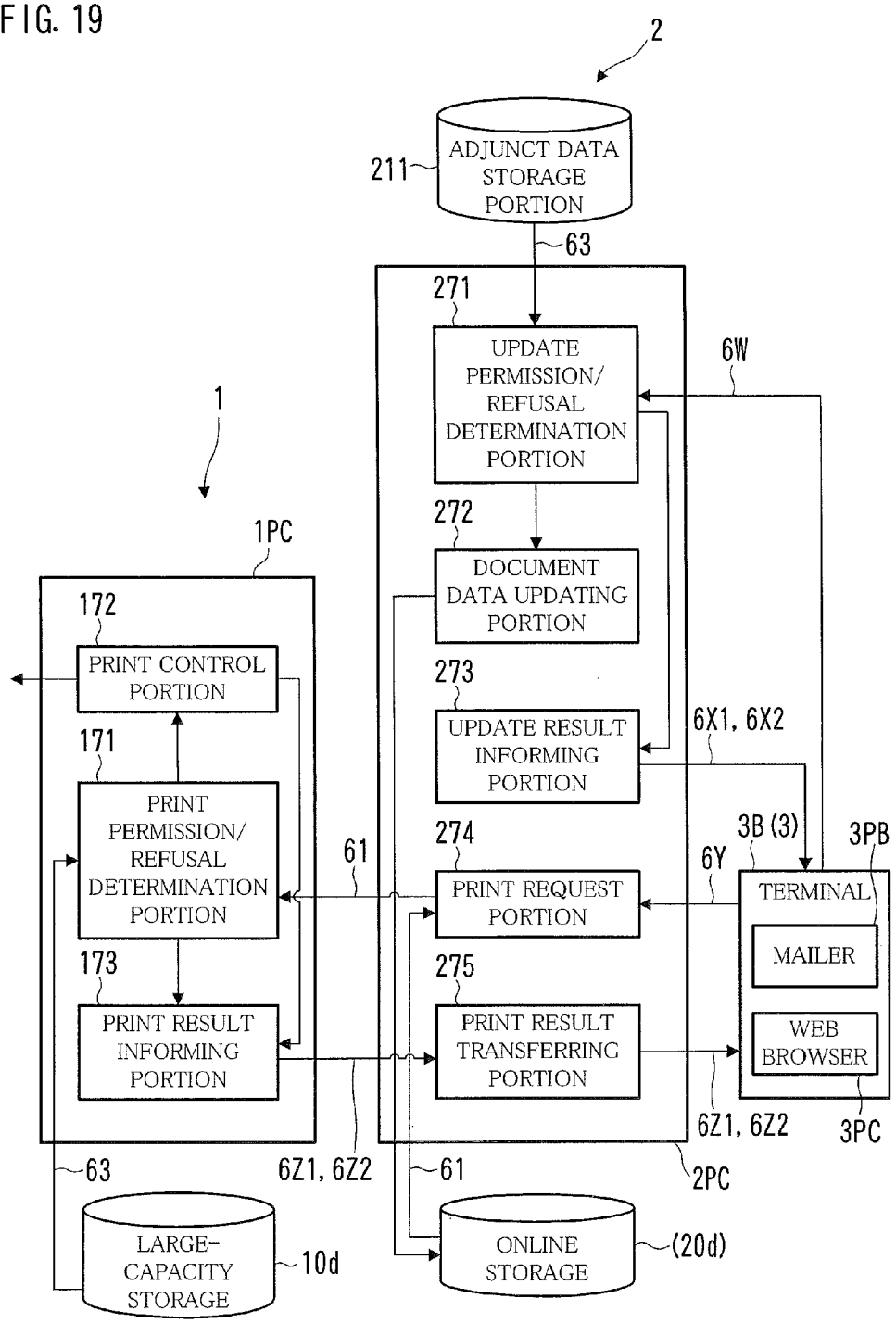
FIG. 19 is a diagram showing an example of the functional configuration implemented in an image forming apparatus by a print program and the functional configuration implemented in a cloud server by an update print program.

The ROM 10c or the large-capacity storage 10d stores, therein, an application program for providing a user with services using the foregoing functions, an upload program 1PA, an identity verification program 1PB, a print program 1PC, and so on (see FIGS. 8, 18, and 19).

An example of the application program is, in particular, a program for box management.

The programs are loaded into the RAM 10b as necessary, and are executed by the system controller 10a. The large-capacity storage 10d is, for example, a hard disk drive or a Solid State Drive (SSD). The system controller 10a is, for example, a Central Processing Unit (CPU) or a Micro Processing Unit (MPU).

The large-capacity storage 10d also stores therein account data 62 on a user-by-user basis. As shown in FIG. 3, the account data 62 indicates an MFP ID, an MFP password, and a business e-mail address for the corresponding user.

The large-capacity storage 10d has boxes on a user-by-user basis. The large-capacity storage 10d stores, therein, access right data 63 for each set of the document data 61 saved in a box.

Referring to FIG. 4, the access right data 63 shows access rights of the corresponding document data 61 in such a manner that an access right of each user is associated with an MFP ID. In the access right field, "R" means that viewing a document corresponding to the document data 61 is permitted, and rewriting the document is not permitted; "W" means that both viewing and rewriting the document are permitted; and "P" means that printing the document is permitted.

The access right data 63 is associated with an identifier of the corresponding document data 61.

The cloud server 2 of FIG. 1 is a server which provides cloud computing services. A common cloud server is often configured of many server machines and virtualized as one server machine. However, for simplicity of explanation, this embodiment takes an example in which the cloud server 2 is configured of one server machine. Further, in this embodiment, a case is described in which the cloud server 2 provides a Social Networking Service (SNS).

Referring to FIG. 5, the cloud server 2 is configured of a system controller 20a, a RAM 20b, a ROM 20c, a large-capacity storage 20d, an NIC 20e, and so on.

The NIC 20e performs communication with the image forming apparatus 1 and the terminal 3 in accordance with a protocol such as TCP/IP through the communication line 4.

Figure 9:
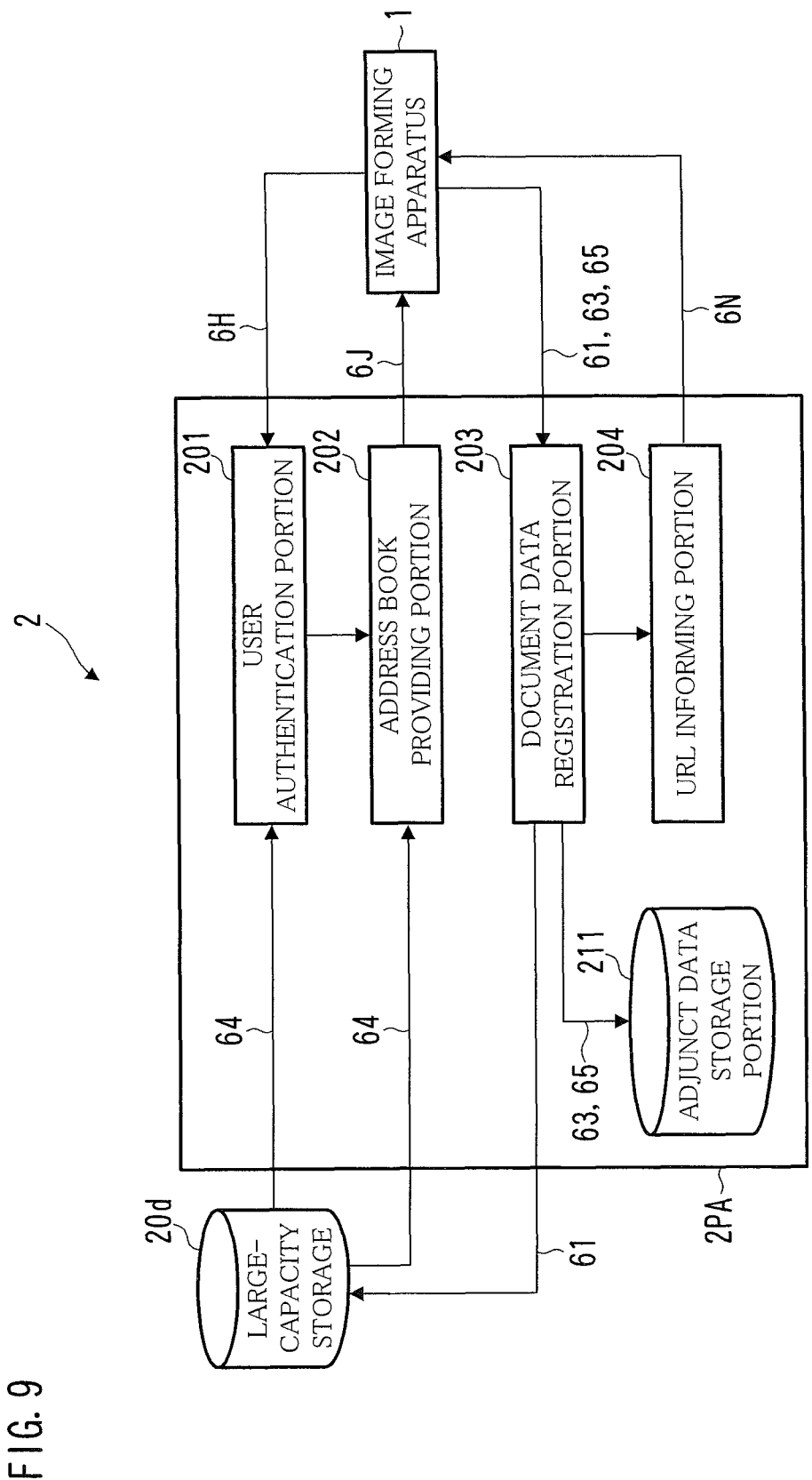
FIG. 9 is a diagram showing an example of the functional configuration implemented in a cloud server by an upload program.

The ROM 20c or the large-capacity storage 20d stores, therein, a program for SNS, an upload program 2PA, a document providing program 2PB, an update print program 2PC, and so on (see FIGS. 9, 18, and 19).

An example of the program for SNS is, in particular, a program for online storage. The program enables management of data saved to the online storage virtually provided in the large-capacity storage 20d. The program also enables a user to gain access to data or edit data through a web browser of the terminal 3. The program also enables a user to share data with other users. Examples of such an online storage service are Google Drive provided by Google Inc., and Evernote provided by Evernote Corporation.

The programs are loaded into the RAM 20b as necessary, and are executed by the system controller 20a. The system controller 20a is, for example, a CPU or an MPU.

Each of the users is given an account necessary to log into the SNS web site. The account is given a unique ID. The ID is hereinafter referred to as an "SNS ID". Passwords for authentication are set on a user-by-user basis. The password is hereinafter referred to as an "SNS password". Each of the users registers his/her e-mail address in advance in the SNS for transmission/reception of e-mail messages through the SNS. Hereinafter, the e-mail address used for this purpose is referred to as an "SNS e-mail address". The SNS e-mail address may be the same as the business e-mail address, or, may be a private e-mail address.

The large-capacity storage 20d stores therein account data 64 on a user-by-user basis. As shown in FIG. 6, the account data 64 indicates an SNS ID, an SNS password, and an SNS e-mail address for the corresponding user. The account data 64 also indicates SNS IDs of all the concerned parties of the user through the SNS, e.g., acquaintances of the corresponding user. Such an SNS ID is called a concerned person SNS ID.

The terminal 3 is a client for a user to receive services provided by the image forming apparatus 1 and the cloud server 2. The user can operate the image forming apparatus 1 by using the terminal 3 instead of using the touch-sensitive panel display 10f. In short, the terminal 3 is used as a remote panel of the image forming apparatus 1.

Referring to FIG. 7, the terminal 3 is configured of a system controller 30a, a RAM 30b, a ROM 30c, a flash memory 30d, an operation button 30e, a touch-sensitive panel display 30f, a digital camera 30g, a mobile phone communication circuit 30h, a wireless Local Area Network (LAN) communication circuit 30i, a charging circuit 30j, a battery 30k, and so on.

The operation button 30e is, for example, a so-called home button. The touch-sensitive panel display 30f displays a variety of screens discussed later. The touch-sensitive panel display 30f is also used for the user to enter a command and information. The digital camera 30g takes an image to generate image data thereof.

The mobile phone communication circuit 30h performs communication through a mobile phone network such as a Wideband Code Division Multiple Access (W-CDMA), CDMA-2000, or a Long Term Evolution (LTE).

The wireless LAN communication circuit 30i performs communication through a wireless communication network (so-called wireless LAN) complying with Institute of Electrical and Electronics Engineers (IEEE) 802.11.

The charging circuit 30j is to charge a battery 30k. The battery 30k is a secondary battery to supply power to the portions of the terminal 3.

Figure 10:
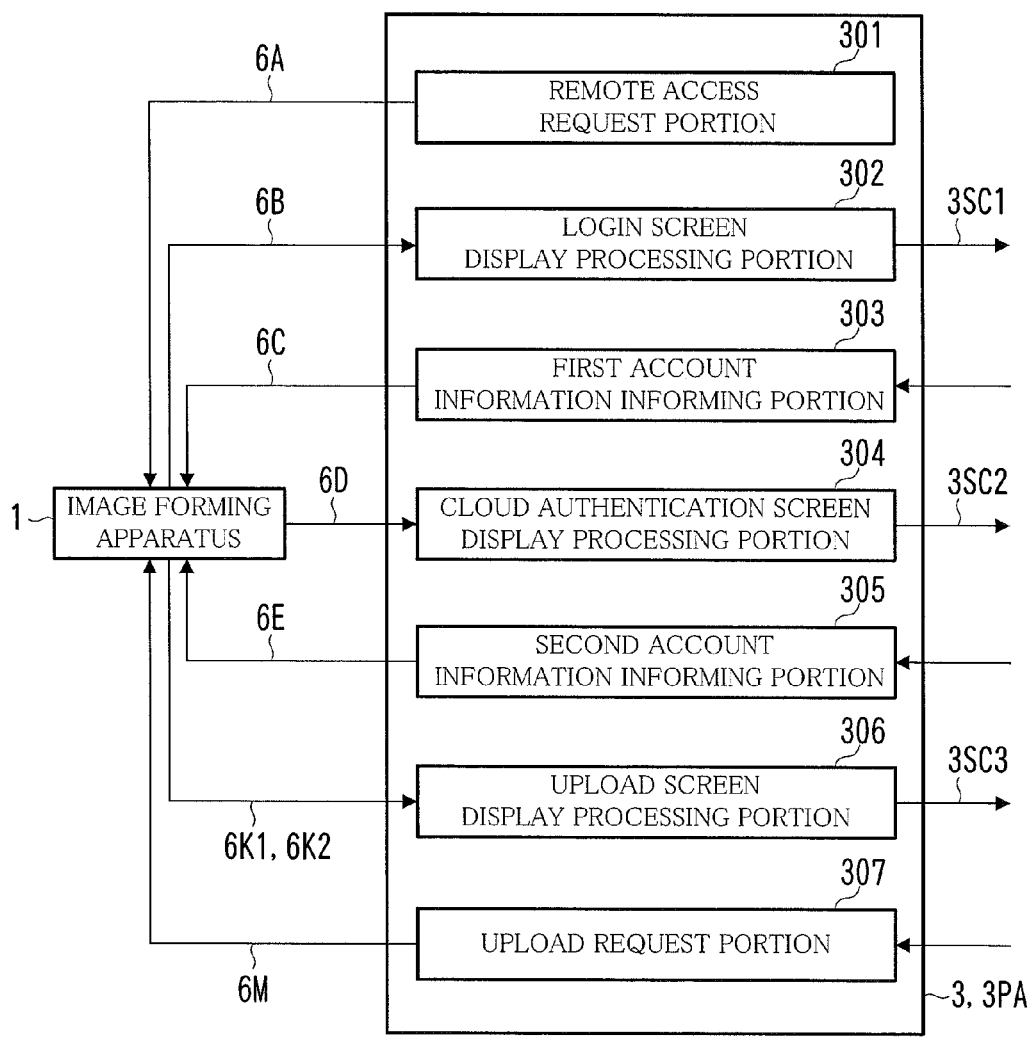
FIG. 10 is a diagram showing an example of the functional configuration implemented in a terminal by a remote panel application.

The ROM 30c or the flash memory 30d stores, therein, programs such as a remote panel application 3PA, a mailer 3PB, and a web browser 3PC (see FIGS. 10, 18, and 19).

The programs are loaded into the RAM 30b as necessary, and are executed by the system controller 30a.

The terminal 3 is, for example, a tablet computer or smartphone. The operating system of the terminal 3 is, for example, Android provided by Google Inc., iOS provided by Apple Inc., or Windows 8 ("Windows" is a registered trademark) provided by Microsoft Corporation. Hereinafter, the terminals 3 may be described separately as a "terminal 3A", "terminal 3B", "terminal 3C", . . . , and so on.

The user operates the terminal 3 to upload the document data 61 saved in a box of the image forming apparatus 1 to the cloud server 2, so that the document data 61 can be shared with the concerned parties of the user. This is implemented by the programs of the individual devices. Hereinafter, the processing by the programs shall be described, the descriptions being broadly divided into the following parts: Processing for uploading the document data 61 to the cloud server 2; and Processing for gaining access to the uploaded document data 61.

[Processing for Uploading the Document Data 61 to the Cloud Server 2]

Figure 11:
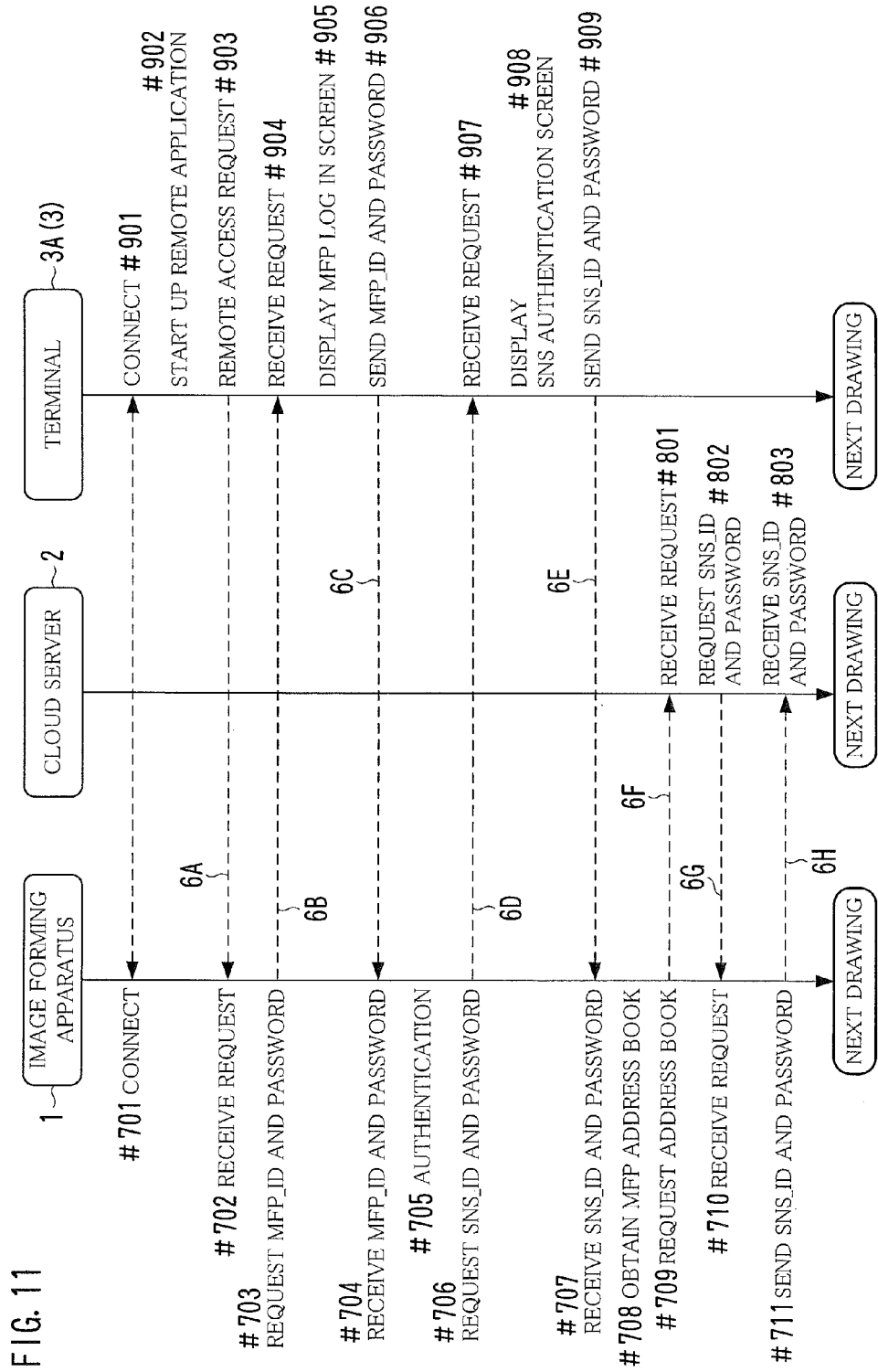
FIG. 11 is a sequence diagram showing an example of the processing flow of an image forming apparatus, a cloud server, and a terminal for uploading.
Figure 12:
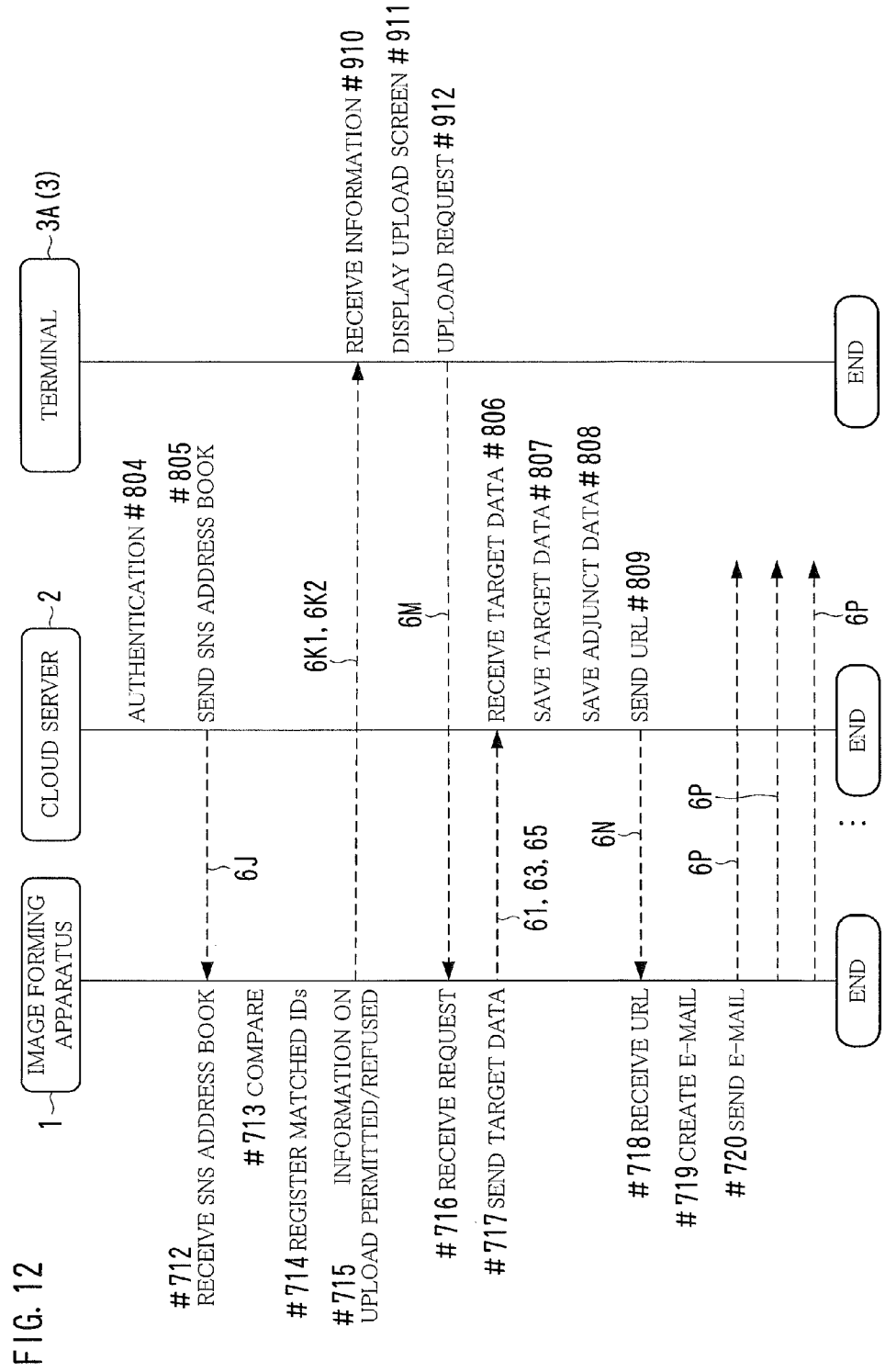
FIG. 12 is a sequence diagram showing an example of the processing flow of an image forming apparatus, a cloud server, and a terminal for uploading.
Figure 13:
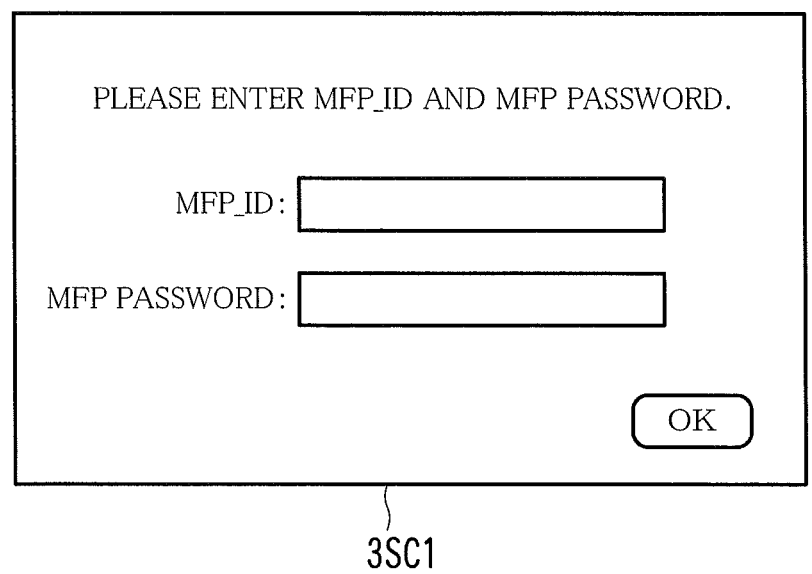
FIG. 13 is a diagram showing an example of a login screen.
Figure 14:
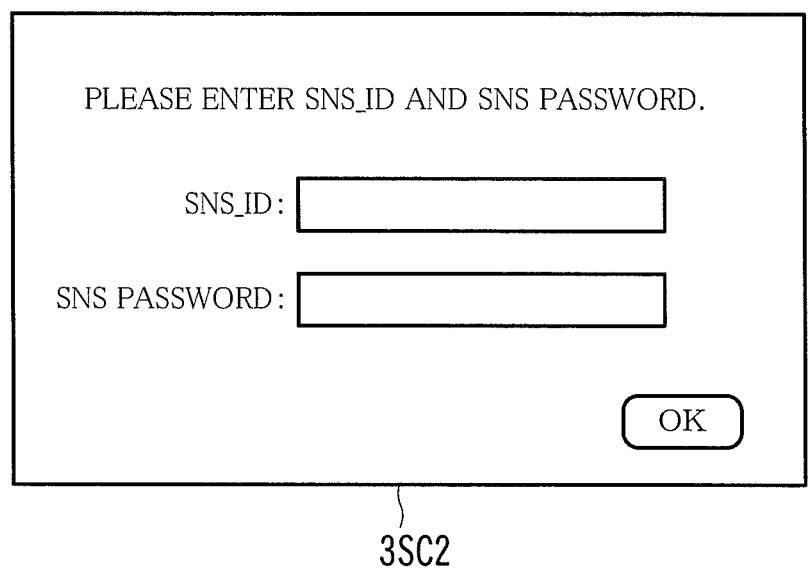
FIG. 14 is a diagram showing an example of an authentication information input screen.
Figure 16:
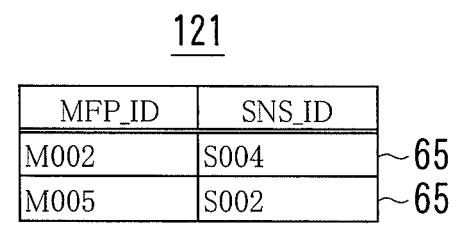

FIG. 8 is a diagram showing an example of the functional configuration implemented in the image forming apparatus 1 by the upload program 1PA. FIG. 9 is a diagram showing an example of the functional configuration implemented in the cloud server 2 by the upload program 2PA. FIG. 10 is a diagram showing an example of the functional configuration implemented in the terminal 3 by the remote panel application 3PA. FIGS. 11 and 12 are sequence diagrams showing an example of the processing flow of the image forming apparatus 1, the cloud server 2, and the terminal 3 for uploading. FIG. 13 is a diagram showing an example of a login screen 3SC1. FIG. 14 is a diagram showing an example of an authentication information input screen 3SC2. FIG. 15 is a diagram depicting an example of checking an MFP address book 601 against an SNS address book 602. FIG. 16 is a diagram showing an example of ID pair data 65. FIG. 17 is a diagram showing an example of an upload data designation screen 3SC3.

The processing for uploading the document data 61 to the cloud server 2 is performed mostly by the upload program 1PA, the upload program 2PA, and the remote panel application 3PA.

The upload program 1PA implements the functions of a first account information request portion 100, a user authentication portion 101, a second account information request portion 102, a first address book obtaining portion 103, a second address book obtaining portion 104, an address book matching portion 105, a correspondence registration portion 106, an upload permission/refusal informing portion 107, an upload processing portion 108, an upload informing portion 109, a correspondence storing portion 121, and so on, all of which are shown in FIG. 8.

The upload program 2PA implements the functions of a user authentication portion 201, an address book providing portion 202, a document data registration portion 203, a URL informing portion 204, an adjunct data storage portion 211, and so on, all of which are shown in FIG. 9.

The remote panel application 3PA implements the functions of a remote access request portion 301, a login screen display processing portion 302, a first account information informing portion 303, a cloud authentication screen display processing portion 304, a second account information informing portion 305, an upload screen display processing portion 306, an upload request portion 307, and so on, all of which are shown in FIG. 10.

These programs enable the user to use the terminal 3 as a remote panel of the image forming apparatus 1 to upload the document data 61 from the image forming apparatus 1 to the cloud server 2.

The description goes on to the processing by the individual portions shown in FIGS. 8-10 with reference to the sequence diagrams shown in FIGS. 11 and 12. The description takes an example where the user operates the terminal 3A to upload the document data 61.

The image forming apparatus 1 and the terminal 3A establish a session therebetween by a conventional method to be connected to each other (Steps #701 and #901 of FIG. 11).

Upon the connection, the terminal 3A starts up the remote panel application 3PA (Step #902).

In the terminal 3A, then, the remote access request portion 301 of FIG. 10 sends the remote access request data 6A to the image forming apparatus 1 to make a request for remote access and upload (Step #903).

In the image forming apparatus 1, when receiving the remote access request data 6A (Step #702), the first account information request portion 100 of FIG. 8 sends account information request data 6B to the terminal 3A to make a request for account information for the image forming apparatus 1 (Step #703).

In the terminal 3A, when receiving the account information request data GB (Step #904), the login screen display processing portion 302 displays the login screen 3SC1, as that shown in FIG. 13, on the touch-sensitive panel display 30f (Step #905). The user enters his/her MFP ID and MFP password on the login screen 3SC1.

When the MFP ID and MFP password are entered, the first account information informing portion 303 sends account data 6C indicating the MFP ID and MFP password to the image forming apparatus 1 (Step #906). In this way, account information necessary for the user of the terminal 3A to use the image forming apparatus 1 is conveyed to the image forming apparatus 1.

In the image forming apparatus 1, when receiving the account data 6C (Step #704), the user authentication portion 101 checks (Step #705) whether or not the user of the terminal 3A is an authorized user based on the account data 6C and the sets of account data 62 (see FIG. 3) stored in the large-capacity storage 10d. To be specific, if the large-capacity storage 10d stores therein account data 62 which indicates the same MFP ID and MFP password as those of the account data 6C, then the user authentication portion 101 determines that the user of the terminal 3A is an authorized user. Otherwise, the user authentication portion 101 determines that the user of the terminal 3A is not an authorized user.

If the user authentication portion 101 determines that the user of the terminal 3A is an authorized user, then login operation to the image forming apparatus 1 by the user of the terminal 3A is completed.

When the user of the terminal 3A is determined to be an authorized user, the second account information request portion 102 sends account information request data 6D to the terminal 3A to make a request for account information for the cloud server 2 (Step #706). When the user of the terminal 3A is not determined to be an authorized user, the processing after Step #705 is not performed.

In the terminal 3A, when receiving the account information request data 6D (Step #907), the cloud authentication screen display processing portion 304 displays the authentication information input screen 3SC2, as that shown in FIG. 14, on the touch-sensitive panel display 30f (Step #908). The user enters his/her SNS ID and SNS password on the authentication information input screen 3SC2.

When the SNS ID and SNS password are entered, the second account information informing portion 305 sends account data 6E indicating the SNS ID and SNS password to the image forming apparatus 1 (Step #909). In this way, account information necessary for the user of the terminal 3A to use the cloud server 2 is conveyed to the image forming apparatus 1.

In the image forming apparatus 1, when receiving the account data 6E (Step #707), the first address book obtaining portion 103 obtains the MFP IDs and the business e-mail addresses from the account data 62 (see FIG. 3) (Step #708). A set of the MFP IDs and the business e-mail addresses thus obtained has a format of address book (see FIG. 15). The set is hereinafter referred to as an "MFP address book 601".

In parallel with the processing by the first address book obtaining portion 103 or before or after the same, the second address book obtaining portion 104 performs processing for obtaining an address book from the cloud server 2 in the following manner.

The second address book obtaining portion 104 sends address book request data 6F to the cloud server 2 to make a request for address book (Step #709).

In the cloud server 2, when the address book request data 6F is received (Step #801), the user authentication portion 201 checks the authenticity of the user of the terminal 3A in the SNS in the following manner. The cloud server 2 sends account information request data 6G to the image forming apparatus 1 to request, from the image forming apparatus 1, account information necessary for the user of the terminal 3A to use the SNS (Step #802).

In the image forming apparatus 1, when receiving the account information request data 6G (Step #710), the second address book obtaining portion 104 sends account data 6H to the cloud server 2 (Step #711). The account data 6H shows the SNS ID and SNS password indicated in the account data GE obtained in Step #707. In this way, the cloud server 2 is given the account information necessary for the user of the terminal 3A to use the SNS.

In the cloud server 2, when receiving the account data 6H (Step #803), the user authentication portion 201 performs authentication on the user of the terminal 3A (Step #804 of FIG. 12). To be specific, if the large-capacity storage 20d stores therein account data 64 (see FIG. 6) which indicates the same SNS ID and SNS password as those of the account data 6H, then the user authentication portion 201 determines that the user of the terminal 3A is an authorized user. Otherwise, the user authentication portion 201 determines that the user of the terminal 3A is not an authorized user.

If the user authentication portion 201 determines that the user of the terminal 3A is an authorized user, then the address book providing portion 202 determines SNS IDs and SNS e-mail addresses of the concerned parties of the user of the terminal 3A based on the account data 64. The address book providing portion 202 then sends address book data 6J indicating the determined SNS IDs and SNS e-mail addresses to the image forming apparatus 1 (Step #805).

A set of the SNS IDs and the SNS e-mail addresses thus determined has a format of address book (see FIG. 15). The set is hereinafter referred to as an "SNS address book 602".

The second address book obtaining portion 104 then receives the address book data 6J (Step #712).

In this way, the SNS address book 602 is provided from the cloud server 2 to the image forming apparatus 1.

On the other hand, if the user authentication portion 201 does not determine that the user of the terminal 3A is an authorized user, then the SNS address book 602 is not provided. Therefore, the image forming apparatus 1 checks whether or not the user of the terminal 3A is successfully authenticated by checking whether or not the address book data 6J is obtained.

The address book matching portion 105 checks the MFP address book 601 against the SNS address book 602 to find out the MFP ID and the SNS ID corresponding to the same user (Step #713). To be specific, the address book matching portion 105 detects an e-mail address that is common to the MFP address book 601 and the SNS address book 602. The address book matching portion 105 then determines that the MFP ID and the SNS ID associated with the common e-mail address correspond to the same user.

In the example of FIG. 15, both the MFP address book 601 and the SNS address book 602 have an address of "wada@x-corp.example.co.jp" and an address of "suzuki@x-corp.example.co.jp". Therefore, the address book matching portion 105 determines that an MFP ID of "M005" and an SNS ID of "S002" both of which are associated with "wada@x-corp.example.co.jp" correspond to the same user. Likewise, the address book matching portion 105 determines that an MFP ID of "M002" and an SNS ID of "S004" both of which are associated with "suzuki@x-corp.example.co.jp" correspond to the same user.

The correspondence registration portion 106 generates ID pair data 65 indicating the MFP ID and the SNS ID that are determined to correspond to the same user by the address book matching portion 105, and stores the ID pair data 65 into the correspondence storing portion 121 (Step #714). In this way, a pair of the MFP ID and the SNS ID is made, and the correspondence therebetween is registered into the correspondence storing portion 121. In the case of FIG. 15, two sets of the ID pair data 65 are stored into the correspondence storing portion 121 as shown in FIG. 16.

In parallel with the processing by the address book matching portion 105 and the correspondence registration portion 106 or before or after the same, the upload permission/refusal informing portion 107 performs processing for informing the terminal 3A of a message as described below. If the second address book obtaining portion 104 obtains the address book data 6J from the cloud server 2, then the upload permission/refusal informing portion 107 sends upload permission data 6K1 to the terminal 3A to inform the terminal 3A that uploading to the cloud server 2 is possible. Otherwise, the upload permission/refusal informing portion 107 sends upload refusal data 6K2 to the terminal 3A to inform the terminal 3A that uploading to the cloud server 2 is impossible.

Note that the upload permission data 6K1 shows identifiers (data name, document name, etc.) of document data 61 that can be uploaded to the cloud server 2 among sets of document data 61 saved in the box. For example, the upload permission data 6K1 shows identifiers of the sets of document data 61 saved in the box of the user of the terminal 3A.

In the terminal 3A, when receiving the upload permission data 6K1 (Step #910), the upload screen display processing portion 306 displays the upload data designation screen 3SC3, as that shown in FIG. 17, on the touch-sensitive panel display 30f (Step #911). The upload data designation screen 3SC3 shows identifiers of the sets of document data 61 indicated in the upload permission data 6K1. The user selects, on the upload data designation screen 3SC3, the document data 61 to be uploaded to the cloud server 2 and be shared with the parties concerned, for example, by touching the identifier of the document data 61.

When receiving the upload refusal data 6K2, the upload screen display processing portion 306 displays a message indicating that uploading to the cloud server 2 is impossible.

The upload request portion 307 sends upload request data 6M indicating the identifier of the document data 61 designated by the user to the image forming apparatus 1 to request the same to upload the document data 61 to the cloud server 2 (Step #912).

In the image forming apparatus 1, when receiving the upload request data 6M (Step #716), the upload processing portion 108 obtains, from the box, the document data 61 having the identifier indicated in the upload request data 6M, and sends, to the cloud server 2, the access right data 63 (see FIG. 4) for the document data 61 and the ID pair data 65 (see FIG. 16) generated in Step #714 (Step #717).

In the cloud server 2, when receiving the document data 61 and the access right data 63 from the image forming apparatus 1 (Step #806), the document data registration portion 203 saves the document data 61 to an online storage of the user of the terminal 3A (Step #807), and saves the access right data 63 and the ID pair data 65 to the adjunct data storage portion 211 (Step #808).

In the foregoing manner, the document data 61 saved in the image forming apparatus 1 is uploaded to the cloud server 2.

The URL informing portion 204 sends, to the image forming apparatus 1, saving location data 6N indicating a URL through which the uploaded document data 61 is accessed (Step #809). The URL has a domain name of the SNS web site, a directory name or sub-domain name of the online storage of the user of the terminal 3A, a file name of the document data 61, and so on.

In the image forming apparatus 1, when the saving location data 6N is received, the upload informing portion 109 generates an e-mail message 6P (see FIG. 22) (Step #719). The e-mail message 6P shows that the document data 61 has been uploaded to the online storage of the user of the terminal 3A, and presents the URL indicated in the saving location data 6N. The e-mail message 6P is then sent to each of the SNS e-mail addresses shown in the SNS address book 602 obtained in Step #712 (Step #720).

The e-mail message 6P is then delivered through a mail server or the like to the terminals 3 of the concerned parties of the user of the terminal 3A.

[Processing for Gaining Access to the Uploaded Document Data 61]

Figure 20:
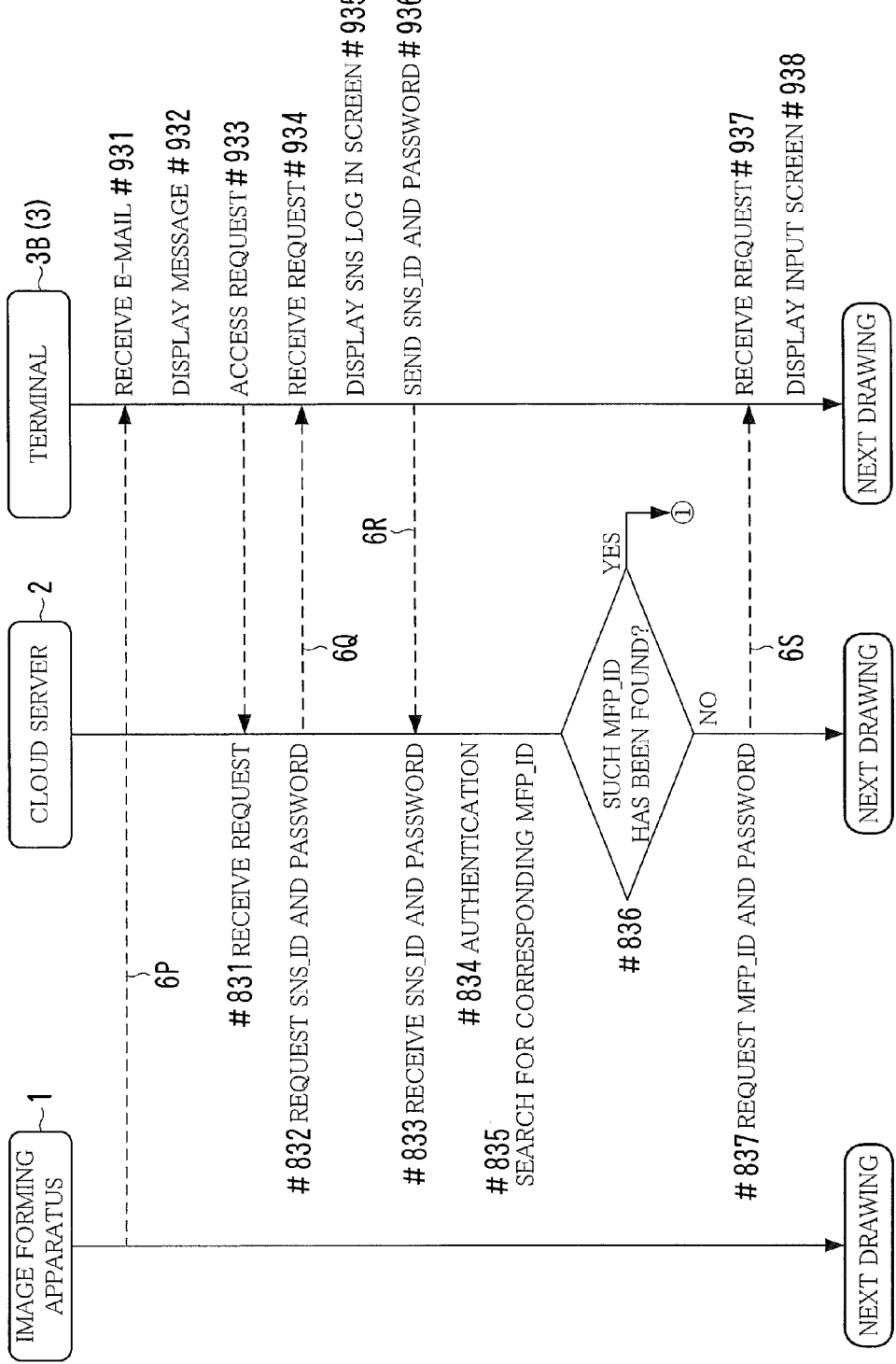
FIG. 20 is a sequence diagram showing an example of the processing flow of an image forming apparatus, a cloud server, and a terminal for viewing.
Figure 21:
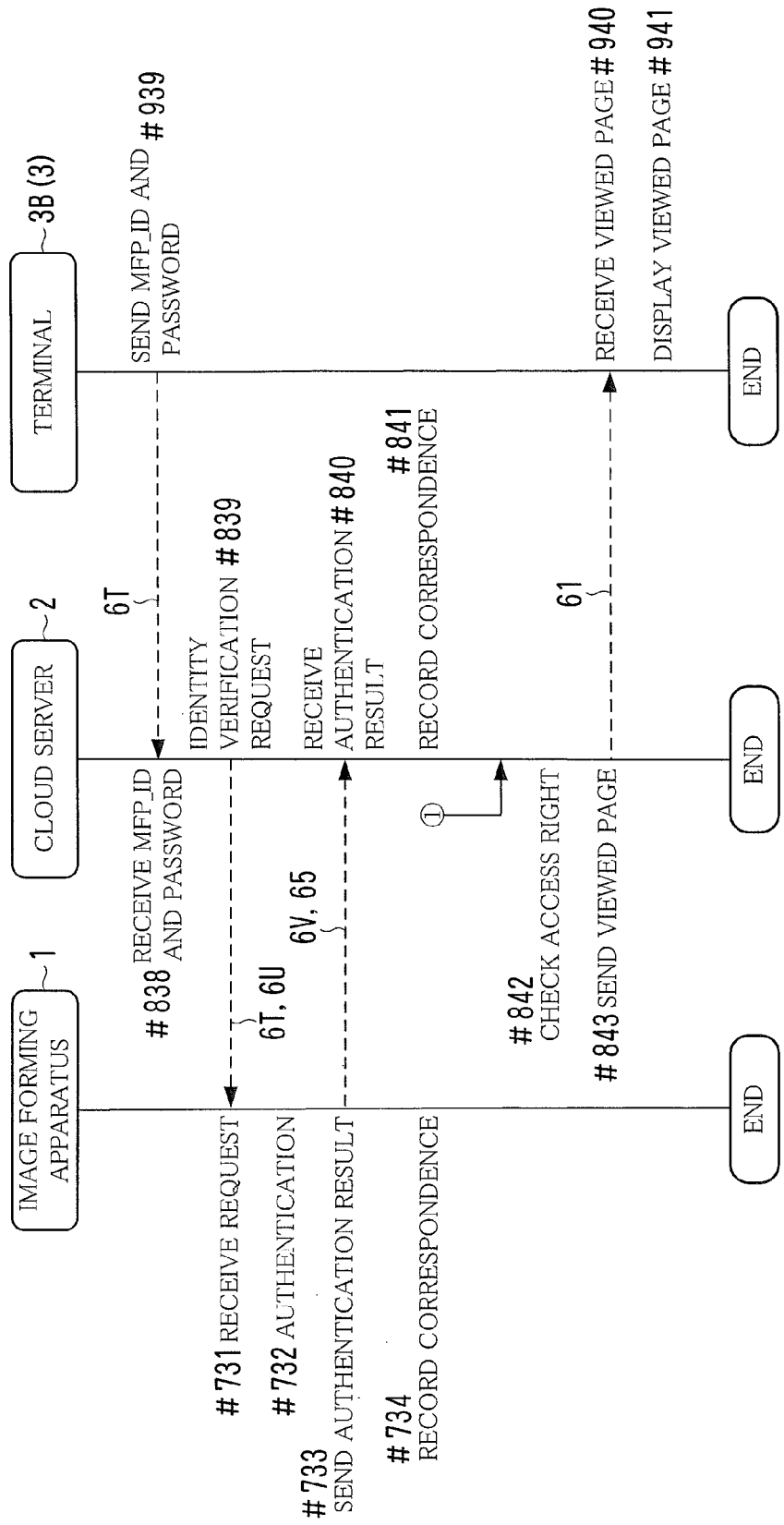
FIG. 21 is a sequence diagram showing an example of the processing flow of an image forming apparatus, a cloud server, and a terminal for viewing.
Figure 22:
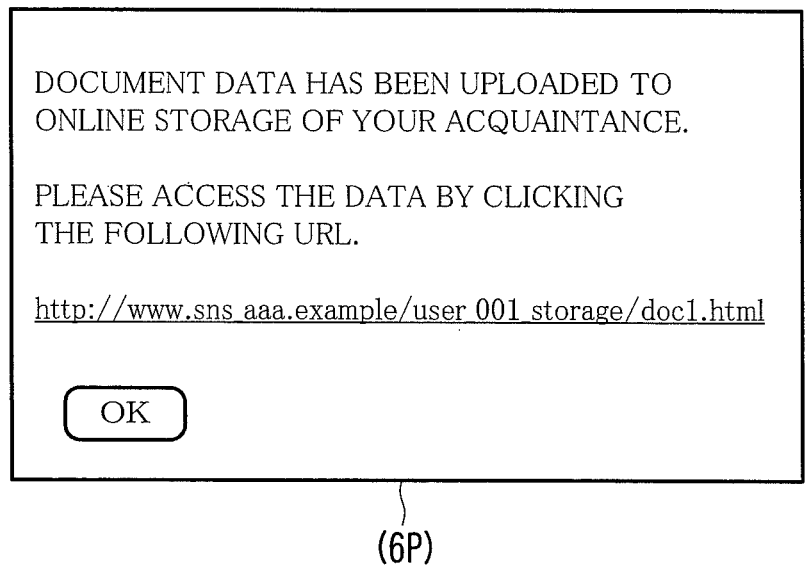
FIG. 22 is a diagram showing an example of the body of an e-mail message.
Figure 23:
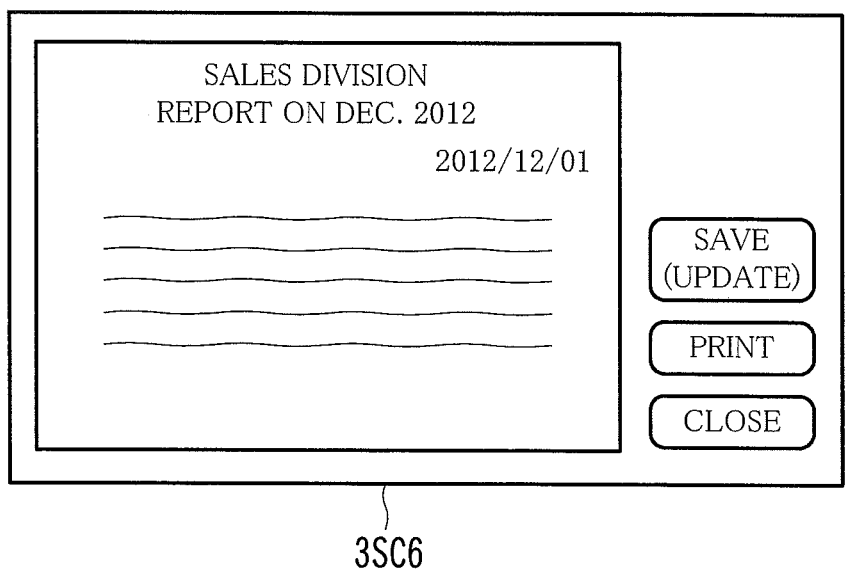
FIG. 23 is a diagram showing an example of a viewed page screen.
Figure 24:
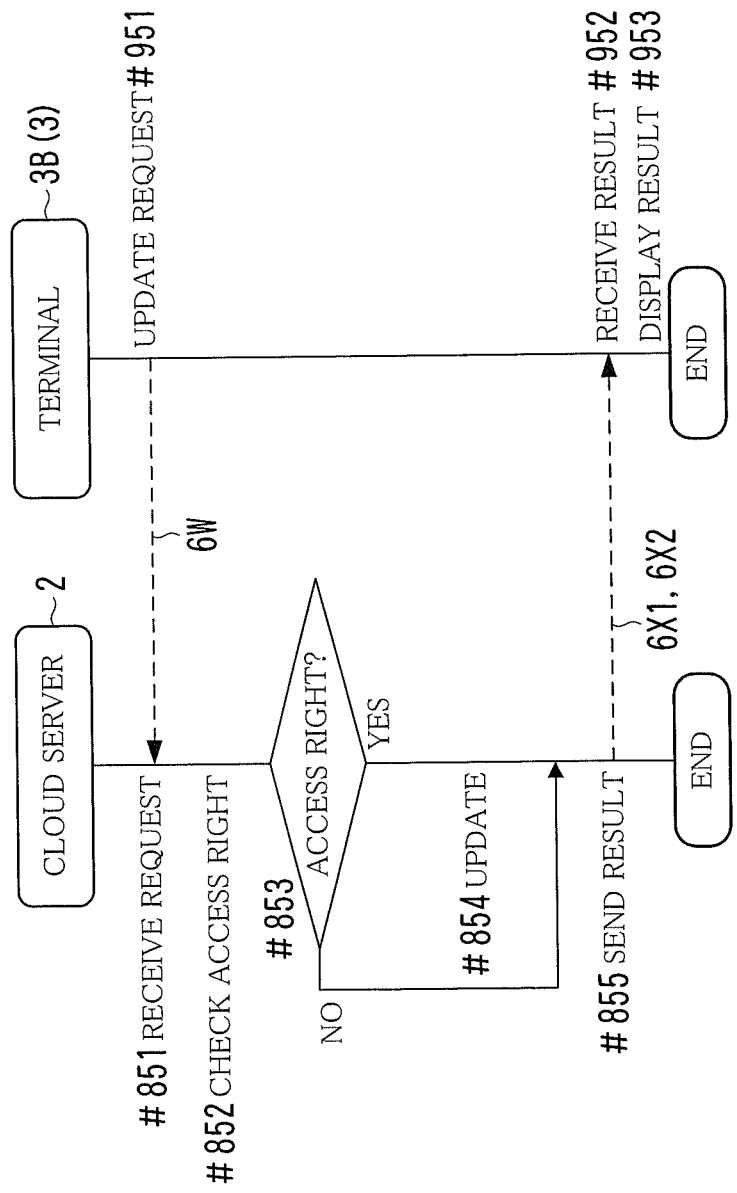
FIG. 24 is a sequence diagram showing an example of the processing flow of an image forming apparatus and a cloud server for updating.

FIG. 18 is a diagram showing an example of the functional configuration implemented in the image forming apparatus 1 by the identity verification program 1PB and the functional configuration implemented in the cloud server 2 by the document providing program 2PB. FIG. 19 is a diagram showing an example of the functional configuration implemented in the image forming apparatus 1 by the print program 1PC and the functional configuration implemented in the cloud server 2 by the update print program 2PC. FIGS. 20 and 21 are sequence diagrams showing an example of the processing flow of the image forming apparatus 1, the cloud server 2, and the terminal 3 for viewing. FIG. 22 is a diagram showing an example of the body of the e-mail message 6P. FIG. 23 is a diagram showing an example of a viewed page screen 3SC6. FIG. 24 is a sequence diagram showing an example of the processing flow of the image forming apparatus 1 and the cloud server 2 for updating. FIG. 25 is a sequence diagram showing an example of the processing flow of the image forming apparatus 1, the cloud server 2, and the terminal 3 for printing.

The processing for gaining access to the uploaded document data 6 is performed mainly by the identity verification program 1PB, the print program 1PC, the document providing program 2PB, the update print program 2PC, the mailer 3PB, and the web browser 3PC.

The identity verification program 1PB implements the functions of a user authentication portion 151, a correspondence registration portion 152, and so on, all of which are shown in FIG. 18.

The print program 1PC implements the functions of a print permission/refusal determination portion 171, a print control portion 172, a print result informing portion 173, and so on, all of which are shown in FIG. 19.

The document providing program 2PB implements the functions of a user authentication portion 251, a corresponding MFP ID search portion 252, an account information request portion 253, an authentication request portion 254, a correspondence registration portion 255, a viewing permission/refusal determination portion 256, a document data providing portion 257, and so on, all of which are shown in FIG. 18.

The update print program 2PC implements the functions of an update permission/refusal determination portion 271, a document data updating portion 272, an update result informing portion 273, a print request portion 274, a print result transferring portion 275, and so on, all of which are shown in FIG. 19.

The description goes on to the processing by the individual portions shown in FIGS. 18 and 19 with reference to the sequence diagrams shown in FIGS. 20, 21, 24, and 25. The description takes an example where the user operates the terminal 3B to obtain access to the document data 61.

When receiving the e-mail message 6P through the mailer 3PB (Step #931 of FIG. 20), the terminal 3B displays the body of the e-mail message 6P shown in FIG. 22 on the touch-sensitive panel display 30f (Step #932). The body contains a message showing that the document data 61 has been uploaded to the online storage of the user of the terminal 3A, an URL of the document data 61, and so on.

When the URL is touched, the terminal 3B starts the web browser 3PC, and makes a request for obtaining access to the document data 61 based on the URL (Step #933). The terminal 3B performs the processing described below with the web browser 3PC.

In the cloud server 2, when receiving the request from the terminal 3B (Step #831), the user authentication portion 251 sends account information request data 6Q to the terminal 3B to request SNS account information from the terminal 3B (Step #832).

When receiving the account information request data 6Q (Step #934), the terminal 3B displays a login screen that is similar to the authentication information input screen 3SC2 (see FIG. 14) on the touch-sensitive panel display 30f (Step #935). The user enters his/her SNS ID and SNS password on the login screen.

When the SNS ID and SNS password are entered, the terminal 3B sends account data 6R indicating the SNS ID and SNS password to the cloud server 2 (Step #936).

In the cloud server 2, when receiving the account data 6R (Step #833), the user authentication portion 251 performs authentication on the user of the terminal 3B based on the account data 6R and the account data 64 (see FIG. 6) (Step

834). The authentication method is the same as that by the user authentication portion 201 (see FIG. 9).

When the user authentication portion 251 confirms that the user of the terminal 3B is an authorized user, the corresponding MFP ID search portion 252 searches for an MFP ID corresponding to the SNS ID of the user in the sets of ID pair data 65 (see FIG. 16) stored in the adjunct data storage portion 211 (Step #835).

If such an MFP ID is found out by the search (Yes in Step #836), then the viewing permission/refusal determination portion 256 and the document data providing portion 257 perform processing for providing the terminal 3B with document data 61 related to the request received in Step #831 (Steps #842 and #843 of FIG. 21). This will be described later.

On the other hand, if such an MFP ID is not found out by the search (No in Step #836), then the account information request portion 253, the authentication request portion 254, and the correspondence registration portion 255 perform the following processing.

The account information request portion 253 sends account information request data 6S to the terminal 3B to request account information for the image forming apparatus 1 from the terminal 3B (Step #837).

When receiving the account information request data 6S (Step #937), the terminal 3B displays an account information input screen that is similar to the login screen 3SC1 (see FIG. 13) on the touch-sensitive panel display 30ƒ (Step #938). The user enters his/her MFP ID and MFP password on the account information input screen.

The terminal 3B sends account data 6T indicating the entered MFP ID and MFP password to the cloud server 2 (Step #939 of FIG. 21).

In the cloud server 2, when receiving the account data 6T (Step #838), the authentication request portion 254 transfers the account data 6T to the image forming apparatus 1 to request the same to determine whether or not the user of the terminal 3B is an authorized user of the image forming apparatus 1 (Step #839). At this time, account data 6U indicating the SNS ID received in Step #833 is also sent to the image forming apparatus 1.

In the image forming apparatus 1, when receiving the account data 6T and the account data 6U (Step #731), the user authentication portion 151 determines whether or not the user of the terminal 3B is an authorized user of the image forming apparatus 1 based on the account data 6T and the sets of account data 62 (see FIG. 3) (Step #732). The determination method is the same as that by the user authentication portion 101 (see FIG. 8). The image forming apparatus 1 sends authentication result data 6V indicating the result of authentication to the cloud server 2 (Step #733).

If it is determined that the user of the terminal 3B is an authorized user of the image forming apparatus 1, then the correspondence registration portion 152 generates ID pair data 65 indicating the MFP ID of the user and the SNS ID indicated in the account data 6U received in Step #731, and stores the ID pair data 65 into the correspondence storing portion 121 (Step #734). Thereby, a new set of the ID pair data 65 is added to the correspondence storing portion 121. The ID pair data 65 is sent to the cloud server 2 along with the authentication result data 6V.

In the cloud server 2, when receiving the authentication result data 6V (Step #840), the correspondence registration portion 255 stores the ID pair data 65 received along with the authentication result data 6V into the adjunct data storage portion 211 (Step #841), provided that the authentication result data 6V indicates that the user is successfully authenticated. Thereby, a new set of the ID pair data 65 is added to the adjunct data storage portion 211.

If the authentication result data 6V indicates that the authentication fails, then the processing for providing the terminal 3B with the document data 61 is cancelled.

If the authentication result data 6V indicates that the user is successfully authenticated, or, alternatively, if an MFP ID corresponding to the SNS ID of the user of the terminal 3B is found out in Step #835, then the viewing permission/refusal determination portion 256 determines whether or not the document data 61 requested from the terminal 3B may be given thereto (Step #842).

The viewing permission/refusal determination portion 256 obtains the access right data 63 (see FIG. 4) of the document data 61. If the MFP ID indicated in the account data 6T received in Step #838 or the MFP ID found out in Step #835 is associated with "R" or "W" in the access right data 63, then the viewing permission/refusal determination portion 256 determines that the document data 61 may be given to the request source. Otherwise, the viewing permission/refusal determination portion 256 determines that the document data 61 cannot be given to the terminal 3B.

If the viewing permission/refusal determination portion 256 determines that the document data 61 requested from the terminal 3B may be given, then the document data providing portion 257 sends the document data 61 to the terminal 3B (Step #843).

When receiving the document data 61 (Step #940), the terminal 3B displays the viewed page screen 3SC6 containing the document as that shown in FIG. 23 on the touch-sensitive panel display 30ƒ (Step #941).

It is possible that the document data providing portion 257 sends, to the terminal 3B, data only on a part of the document that can be displayed concurrently in the web browser 3PC instead of sending the entirety of the document data 61 at one time. In such a case, data on the other part of the document may be sent appropriately in accordance with scroll operation or page shift operation. Alternatively, the document data 61 may be converted to data compatible with a web application and sent.

On the other hand, if the viewing permission/refusal determination portion 256 determines that the document data 61 cannot be given to the terminal 3B in Step #842, then the document data providing portion 257 sends, instead of the document data 61, a message indicating that the user of the terminal 3B has no access right to the document data 61 to the terminal 3B. The terminal 3B displays the message instead of the document corresponding to the document data 61.

The user is allowed to update or print the displayed document in accordance with the access right given to him/her.

When the user edits the document and enters a command to save the same, the terminal 3B sends edit details data 6W indicating the edit details and the identifier of the document data 61 to the cloud server 2 to request the same to update the document data 61 (Step #951 of FIG. 24).

In the cloud server 2, when receiving the edit details data 6W (Step #851), the update permission/refusal determination portion 271 determines whether or not the document data 61 can be updated in the following manner (Step #852).

The update permission/refusal determination portion 271 reads out the access right data 63 (see FIG. 4) of the document data 61. If the access right data 63 shows that the MFP ID of the user of the terminal 3B is associated with "W", then the update permission/refusal determination portion 271 determines that the document data 61 may be updated. Otherwise, the update permission/refusal determination portion 271 determines that the document data 61 cannot be updated.

If the update permission/refusal determination portion 271 determines that the document data 61 may be updated (Yes in Step #853), then the document data updating portion 272 updates the document data 61 based on the edit details data 6W (Step #854).

When the document data 61 is completely updated, the update result informing portion 273 transmits update completion notification data 6X1 to the terminal 3B. When the user is not given an access right for update, the update result informing portion 273 transmits update refusal notification data 6X2 to the terminal 3B (Step #855).

When receiving the update completion notification data 6X1, the terminal 3B displays a message showing that update has been completed on the touch-sensitive panel display 30ƒ (Step #952 and Step #953). When receiving the update refusal notification data 6X2, the terminal 3B displays a message showing that the user is not authorized to update (has no access right for update) on the touch-sensitive panel display 30ƒ (Step #952 and Step #953).

When the user enters a command to print out a document, the terminal 3B sends print request data 6Y indicating the identifier of the document data 61 corresponding to the document to the cloud server 2 to request the same to print out the document (Step #961 of FIG. 25).

In the cloud server 2, when receiving the print request data 6Y (Step #861), the print request portion 274 obtains, from the online storage, the document data 61 corresponding to the identifier indicated in the print request data 6Y, and transfers the document data 61 to the image forming apparatus 1 to request the same to print out the document (Step #862). At this time, the cloud server 2 informs the image forming apparatus 1 of the identifier of the document data 61 and the MFP ID of user of the terminal 3B. The MFP ID is one that has been found out by the search in Step #835 of FIG. 20 or one that has been determined to be the MFP ID of the user of the terminal 3B in Step #732 of FIG. 21.

In the image forming apparatus 1, when receiving the document data 61 (Step #761), the print permission/refusal determination portion 171 determines whether or not the document can be printed out (Step #762).

The print permission/refusal determination portion 171 obtains the access right data 63 of the document data 61 from the large-capacity storage 10d based on the identifier conveyed by the cloud server 2. If the access right data 63 shows that the MFP ID of user of the terminal 3B is associated with "P", then the print permission/refusal determination portion 171 determines that the document can be printed out. Otherwise, the print permission/refusal determination portion 171 determines that document cannot be printed out.

If the print permission/refusal determination portion 171 determines that the document can be printed out (Yes in Step #763), then the print control portion 172 controls the output image processing circuit 10k and the printing unit 10m in such a manner that the document is printed onto paper based on the received document data 61 (Step #764). In this way, the document is printed out onto paper.

When the printing is completely finished, the print result informing portion 173 sends print completion notification data 6Z1 to the cloud server 2. When the user is not given an access right for printing, the print result informing portion 173 sends print refusal notification data 6Z2 to the terminal 3B (Step #765).

In the cloud server 2, the print result transferring portion 275 transfers the print completion notification data 6Z1 or the print refusal notification data 6Z2 to the terminal 3B (Steps #863 and #864).

When receiving the print completion notification data 6Z1, the terminal 3B displays a message indicating that printing has been completed on the touch-sensitive panel display 30ƒ (Steps #962 and #963). When receiving the print refusal notification data 6Z2, the terminal 3B displays a message indicating that the user is not authorized to perform printing (has no access right for printing) on the touch-sensitive panel display 30ƒ (Steps #962 and #963).

The document data 61 sent from the cloud server 2 to the image forming apparatus 1 is originally document data uploaded from the image forming apparatus 1. Therefore, instead of sending the document data 61 from the cloud server 2 in Step #862, it is possible that the image forming apparatus 1 obtains the same document data 61 from the box and performs printing based on the obtained document data 61.

The print request portion 274 informs the image forming apparatus 1 of the MFP ID of the user of the terminal 3B. Instead of this, the print request portion 274 may inform the image forming apparatus 1 of the SNS ID thereof. In such a case, the print permission/refusal determination portion 171 preferably identifies an MFP ID corresponding to the SNS ID based on the ID pair data 65, and determines whether or not printing is possible.

It is the cloud server 2 that determines whether or not browse or update is possible. Instead of this, however, the image forming apparatus 1 may make the determination as with the case of determination as to whether or not printing is possible. It is the image forming apparatus 1 that determines whether or not printing is possible. Instead of this, however, the cloud server 2 may make the determination as with the case of determination as to whether or not browse or update is possible.

According to this embodiment, it is possible to control, in the image forming apparatus 1 and the cloud server 2, access to the document data 61 based on a same access right more easily than is conventionally possible.

In essence, in two systems or devices where different user accounts are used, it is possible to control access to a same set of data based on a same access right more easily than is conventionally possible.

In this embodiment, an ID and a password are used as the user account information. Instead of this, biometric information such as fingerprints or face images may be used as the user account information.

In this embodiment, an e-mail address is used as the information on user. Instead of this, other types of information such as address or telephone number may be used as the information on user. Alternatively, a plurality of pieces of information may be combined for use in the information on user. For example, the date of birth, gender, and contact information (e-mail, address, or telephone number) may be combined together.

In this embodiment, the case is described in which each user is given one account. The present invention is also applicable to the case where each group of a plurality of users is given one account. In such a case, the devices preferably perform the foregoing processing with one group deemed as one user.

In this embodiment, the cloud server 2 provides, as the SNS address book 602, an address book containing SNS IDs and SNS e-mail addresses of all the concerned parties of the logged-in user to the image forming apparatus 1. Instead of this, it is possible to provide the image forming apparatus 1 with an address book containing SNS IDs and SNS e-mail addresses of persons designated by the user.

In this embodiment, the image forming apparatus 1 and the terminal 3 perform communication with each other via the communication line 4. Instead of this, the communication may be performed wirelessly via Bluetooth (registered trademark), a wireless USB, a ZigBee, or the like.

In this embodiment, the terminal 3 is a tablet computer or a smartphone. Instead of this, a personal computer or a mobile phone terminal may be used as the terminal 3.

In this embodiment, user authentication is performed. Instead of this, authentication on the terminal 3 (so-called hardware authentication) may be performed. In such a case, the authentication is preferably performed by checking whether or not the identity information of the terminal 3, e.g., an IP address or Media Access Control (MAC) address thereof, is registered in advance in the image forming apparatus 1 or the cloud server 2.

In this embodiment, the image forming apparatus 1 makes a pair of an MFP ID and an SNS ID. Instead of this, the cloud server 2 may make a pair thereof. In such a case, the cloud server 2 obtains the MFP address book 601 from the image forming apparatus 1, and makes a pair of an MFP ID and an SNS ID. The image forming apparatus 1 may obtain the result of pairing from the cloud server 2.

When the document data 61 saved in the online storage of the cloud server 2 is updated, the image forming apparatus 1 may update the original document data 61 similarly. In short, synchronization may be achieved between the original document data 61 and the document data 61 saved in the online storage.

The upload program 1PA, the identity verification program 1PB, and the print program 1PC may be configured as one program. Likewise, the upload program 2PA, the document providing program 2PB, and the update print program 2PC may be configured as one program. The remote panel application 3PA, the mailer 3PB, and the web browser 3PC may be configured as one program.

In this embodiment, the case is described in which a duplicate set of the document data 61 is saved to the online storage for SNS. The present invention is also applicable to the case of saving data to an online storage not for SNS.

In this embodiment, the case is described in which the document data 61 is shared by users. The present invention is also applicable to the case where music data or moving image data is shared by users.

The present invention is also applicable to the case where the document data 61 saved in the online storage for the cloud server 2 is uploaded to the box of the image forming apparatus 1. In such a case, the image forming apparatus 1 and the cloud server 2 preferably switch the roles thereof for the foregoing processing. In such a case, an access right that has been set for SNS may be used in the image forming apparatus 1.

It is to be understood that the configurations of the network system 5, the image forming apparatus 1, the cloud server 2, and the terminal 3, the constituent elements thereof, the content and order of the processing, the configuration of data, the configuration of the screens, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A shared data managing device that manages shared data, the device comprising:
   a management portion that manages a first user account that includes a first identifier and first user information on a first user who receives a first service associated with the first identifier;
   an obtaining portion that obtains, from a service providing system that provides a second service, a second identifier of a second user account used for the second service and second user information on a second user associated with the second identifier;
   a pairing portion that, when the first user information and the second user information include identical information, pairs the first identifier associated with the first user information with the second identifier associated with the second user information; and
   a transmission portion that sends, to the service providing system, the shared data, the pair of the first identifier and the second identifier, and an access right set on the first user account.

2. The shared data managing device according to claim 1, comprising a printer that, when the service providing system informs the shared data managing device of a print command together with the first identifier or the second identifier, prints an image based on the shared data in accordance with the access right corresponding to the first user account that includes the first identifier, or, alternatively, in accordance with the access right corresponding to the first user account that includes the first identifier paired with the second identifier.

3. A shared data managing method that manages shared data the method comprising:
   managing, with a device, a first user account that includes a first identifier and first user information on a first user who is to receive a first service associated with the first identifier;
   obtaining, with the device, a second identifier of a second user account used for a second service and second user information associated with the second identifier from a service providing system;
   when the first user information and the second user information include identical information, paring, with the device, the first identifier associated with the first user information with the second identifier associated with the second user information; and
   sending, with the device, the shared data, the pair of the first identifier and the second identifier, and an access right set on the first user account, to the service providing system.

4. The shared data managing method according to claim 3, comprising:
   receiving, with the device, authentication information that includes the first identifier from the second user who has logged in 25 with the second user account, and
   confirming, with the device, authenticity of the second user who has logged in based on the authentication information; wherein
   when the authenticity of the second user who has logged in is confirmed, the first identifier received from 30 the second user is paired with the second identifier of the second user account of the second user.

5. The shared data managing method according to claim 3, wherein the second user account is a user account of a concerned party of an owner of the shared data, or, a user account of a party designated by the owner.

6. The shared data managing method according to claim 3, wherein
   the first user information is contact information for the first user, and
   the second user information is contact information for the second user.

7. A non-transitory computer-readable storage medium storing thereon a computer program used in a computer that manages shared data, the computer program causing the computer to:
   manage a first user account that includes a first identifier and first user information on a first user who is to receive a first service associated with the first identifier;
   obtain, from a service providing system that provides a second service, a second identifier of a second user account used for the second service and second user information on a second user associated with the second identifier;
   pair the first identifier associated with the first user information with the second identifier associated with the second user information; and
   send, to the service providing system, the shared data, the pair, and an access right set on the first user account.

8. The non-transitory computer-readable storage medium according to claim 7, wherein, when the service providing system informs the shared data managing device of a print command together with the first identifier or the second identifier, the computer program causes the computer to print an image based on the shared data in accordance with the access right corresponding to the first user account that includes the first identifier, or, alternatively, in accordance with the access right corresponding to the first user account that includes the first identifier paired with the second identifier.

* * * * *